(12) United States Patent
Graffagnino et al.

(10) Patent No.: US 9,226,192 B2
(45) Date of Patent: *Dec. 29, 2015

(54) MOBILE CELLULAR NETWORK BACKHAUL

(71) Applicant: Oceus Networks Inc., Reston, VA (US)

(72) Inventors: Vincent Graffagnino, Rockwall, TX (US); Dennis Niermann, Richardson, TX (US)

(73) Assignee: Oceus Networks Inc., Reston, VA (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/264,297

(22) Filed: Apr. 29, 2014

(65) Prior Publication Data

US 2014/0323137 A1  Oct. 30, 2014

Related U.S. Application Data

(60) Provisional application No. 61/817,111, filed on Apr. 29, 2013.

(51) Int. Cl.
*H04W 36/30* (2009.01)
*H04W 36/18* (2009.01)
(Continued)

(52) U.S. Cl.
CPC ........ *H04W 28/0289* (2013.01); *H04W 84/005* (2013.01); *H04W 8/06* (2013.01); *H04W 92/16* (2013.01); *H04W 92/24* (2013.01)

(58) Field of Classification Search
CPC ..... H04W 36/30; H04W 36/18; H04W 36/14; H04W 36/0055; H04W 88/06; H04W 16/32; H04W 36/0055; H04W 76/02; H04B 7/2606
USPC ........................................................ 455/411
See application file for complete search history.

(56) References Cited

U.S. PATENT DOCUMENTS 5,768,501 A   6/1998 Lewis
6,842,462 B1 * 1/2005 Ramjee et al. ................ 370/466
(Continued)

FOREIGN PATENT DOCUMENTS

EP    1 401 229 A1   3/2004
EP    1 553 734 A1   7/2005
(Continued)

OTHER PUBLICATIONS

"Digital cellular telecommunications system (Phase 2+); Universal Mobile Telecommunications System (UMTS); LTE; Interworking between the Public Land Mobile Network (PLMN) supporting packet based services and Packet Data Networks (PDN)" Technical Specification, European Telecommunication Standards Institute (ETSI), France, vol. 36PP CT3, No. V11.4.0, Apr. 1, 2013.

(Continued)

*Primary Examiner* — Sharad Rampuria
*Assistant Examiner* — Obidon Bassinan
(74) *Attorney, Agent, or Firm* — Knobbe, Martens, Olson & Bear, LLP

(57) ABSTRACT

A mobile cellular network (MCN) communication system can provide an independent mobile cellular network to devices within a covered area. In addition, the MCN communication system can communicate with other MCN communication systems using a wireless standard that is similar to the wireless standard used to communicate with user equipment within the covered area. In some instances, the MCN communication system can be registered as a user equipment of another MCN communication system and/or have another MCN communication system registered with it as a user equipment.

26 Claims, 11 Drawing Sheets

Fig.2

(51) Int. Cl.
*H04W 36/14* (2009.01)
*H04W 36/12* (2009.01)
*H04W 36/08* (2009.01)
*H04W 28/02* (2009.01)
*H04W 84/00* (2009.01)
*H04W 8/06* (2009.01)
*H04W 92/16* (2009.01)
*H04W 92/24* (2009.01)

(56) References Cited

U.S. PATENT DOCUMENTS

| | | | |
|---|---|---|---|
| 7,486,967 B2 | 2/2009 | Pan et al. | |
| 7,535,861 B2 | 5/2009 | Buchholz et al. | |
| 7,539,158 B2 | 5/2009 | Pan | |
| 7,548,763 B2 | 6/2009 | Pan | |
| 7,573,713 B2 | 8/2009 | Hoffman et al. | |
| 7,653,414 B2 | 1/2010 | Pan | |
| 7,684,801 B2 | 3/2010 | Suzuki et al. | |
| 7,817,589 B2 | 10/2010 | Hoffmann et al. | |
| 7,840,230 B2 | 11/2010 | Pan | |
| 7,855,988 B2 | 12/2010 | Pan | |
| 7,856,233 B2 | 12/2010 | Pan | |
| 7,979,066 B2 | 7/2011 | Pan | |
| 8,036,158 B2 | 10/2011 | Pan et al. | |
| 8,046,420 B2 | 10/2011 | Pan | |
| 8,089,920 B2 | 1/2012 | Pan | |
| 8,107,409 B2 | 1/2012 | Pan | |
| 8,140,077 B2 | 3/2012 | Saifullah et al. | |
| 8,224,322 B2 | 7/2012 | Pan | |
| 8,270,325 B2 | 9/2012 | Hoffmann et al. | |
| 8,310,990 B2 | 11/2012 | Pan | |
| 8,326,286 B2 | 12/2012 | Pan | |
| 8,340,667 B2 | 12/2012 | Pan | |
| 8,359,029 B2 | 1/2013 | Pan | |
| 8,374,124 B2 | 2/2013 | Abusch-Magder et al. | |
| 8,626,210 B2 | 1/2014 | Hicks, III | |
| 8,654,749 B2 | 2/2014 | Buchholz et al. | |
| 8,676,197 B2 | 3/2014 | Pan et al. | |
| 8,688,111 B2 * | 4/2014 | Pan | 455/433 |
| 8,706,105 B2 * | 4/2014 | Pan | 455/423 |
| 8,744,435 B2 | 6/2014 | Pan | |
| 8,780,804 B2 | 7/2014 | Pan | |
| 8,811,992 B2 | 8/2014 | Hoole | |
| 8,824,969 B2 | 9/2014 | Nakamori et al. | |
| 2001/0013107 A1 | 8/2001 | Lewis | |
| 2006/0098661 A1 | 5/2006 | Pan | |
| 2006/0234747 A1 | 10/2006 | Pan et al. | |
| 2006/0234774 A1 | 10/2006 | Pan et al. | |
| 2007/0049267 A1 | 3/2007 | Kota et al. | |
| 2007/0202847 A1 | 8/2007 | Pan et al. | |
| 2007/0232267 A1 | 10/2007 | Pan et al. | |
| 2007/0264930 A1 | 11/2007 | Daoudal | |
| 2007/0287452 A1 | 12/2007 | Pan et al. | |
| 2008/0005380 A1 | 1/2008 | Kawasaki et al. | |
| 2008/0039144 A1 | 2/2008 | Pan et al. | |
| 2008/0108378 A1 | 5/2008 | Gessner et al. | |
| 2008/0146158 A1 | 6/2008 | Pan et al. | |
| 2008/0181188 A1 | 7/2008 | Aghvami et al. | |
| 2008/0268830 A1 | 10/2008 | Sharma et al. | |
| 2008/0285492 A1 | 11/2008 | Vesterinen | |
| 2009/0201878 A1 | 8/2009 | Kotecha et al. | |
| 2009/0205023 A1 | 8/2009 | Pan et al. | |
| 2009/0227235 A1 | 9/2009 | Pan et al. | |
| 2009/0271491 A1 | 10/2009 | Pan et al. | |
| 2009/0280853 A1 | 11/2009 | Brisebois et al. | |
| 2009/0325584 A1 | 12/2009 | Pan et al. | |
| 2009/0327819 A1 | 12/2009 | Pan et al. | |
| 2010/0008306 A1 | 1/2010 | Pan et al. | |
| 2010/0008369 A1 * | 1/2010 | Pan | 370/401 |
| 2010/0027448 A1 | 2/2010 | Puthiyandyil et al. | |
| 2010/0075668 A1 | 3/2010 | Pan et al. | |
| 2010/0105373 A1 | 4/2010 | Kanade | |
| 2010/0190470 A1 | 7/2010 | Raleigh | |
| 2010/0197268 A1 | 8/2010 | Raleigh | |
| 2010/0202455 A1 | 8/2010 | Sundaram et al. | |
| 2010/0260157 A1 | 10/2010 | Buchholz et al. | |
| 2011/0059740 A1 | 3/2011 | Pan et al. | |
| 2011/0060853 A1 | 3/2011 | Pan et al. | |
| 2011/0122824 A1 | 5/2011 | Muhanna et al. | |
| 2011/0176536 A1 | 7/2011 | De Franca Lima et al. | |
| 2011/0195743 A1 | 8/2011 | Jee et al. | |
| 2011/0202589 A1 | 8/2011 | Piernot et al. | |
| 2011/0223921 A1 | 9/2011 | Pan et al. | |
| 2011/0275364 A1 | 11/2011 | Austin et al. | |
| 2012/0002607 A1 | 1/2012 | Pan et al. | |
| 2012/0051321 A1 | 3/2012 | De et al. | |
| 2012/0094659 A1 | 4/2012 | Pan et al. | |
| 2012/0106454 A1 | 5/2012 | Pan et al. | |
| 2012/0147874 A1 | 6/2012 | Kotecha | |
| 2012/0224474 A1 | 9/2012 | Beser | |
| 2012/0224566 A1 | 9/2012 | O'Leary | |
| 2012/0252444 A1 | 10/2012 | Pan et al. | |
| 2012/0276866 A1 | 11/2012 | Sennett et al. | |
| 2013/0028097 A1 | 1/2013 | Barrett | |
| 2013/0029708 A1 | 1/2013 | Fox et al. | |
| 2013/0039279 A1 | 2/2013 | Pan et al. | |
| 2013/0065583 A1 | 3/2013 | Pan et al. | |
| 2013/0130677 A1 | 5/2013 | Pan et al. | |
| 2013/0148578 A1 | 6/2013 | Pan et al. | |
| 2014/0057626 A1 | 2/2014 | Uelk et al. | |
| 2014/0057636 A1 | 2/2014 | Schemagin et al. | |
| 2014/0154967 A1 | 6/2014 | Pan et al. | |
| 2014/0173388 A1 | 6/2014 | Pan et al. | |
| 2014/0315553 A1 * | 10/2014 | Hoole | 455/436 |

FOREIGN PATENT DOCUMENTS

| | | |
|---|---|---|
| EP | 2 031 920 A1 | 3/2009 |
| GB | 2452796 | 3/2009 |
| WO | WO 2007/044880 | 4/2007 |
| WO | WO 2009/100736 A1 | 8/2009 |
| WO | WO 2009/127965 A1 | 10/2009 |
| WO | WO 2014/031689 A2 | 2/2014 |

OTHER PUBLICATIONS

PCT International Search Report; PCT/US2014/035732; Date of Mailing Sep. 26, 2014; pp. 1-5.
International Search Report and Written Opinion dated Nov. 8, 2013, International Application No. PCT/US2013/055721.
International Search Report and Written Opinion dated Feb. 11, 2014, International Application No. PCT/US2013/055864.
Philip Nystromer: "Quiclink: a Portable 3G WCDMA Cellular Service, Deployed in Minutes" Presentation, Jun. 11, 2007, pp. 1-27.
Press Release: *Harris Corporation Introduces Tactical 3G Cellular Network-in-a-Box for Warfighters, Published Apr. 19, 2011,* http://harris.com/view_pressrelease.asp?pr_id=3230.
Press Release: *Tecore Unveils the Mobile Industry's First 3G-4G Network in a Box (NIB),*Published Feb. 14, 2011, http://www.tecore.com/newsevents/release.cfm?newsID=164.
Tecore Networks, *The Mobile Industry's First All-In-One Network Solution Supporting WCDMA, HSPA+ and LTE,* date of publication unknown, http://www.tecore.com/solutions/TecoreNetworks-Datasheet-2G-3G-4G-NetworkInABox.pdf.
Vikram Kaul, et al.: "On the adpatation of commercial smartphones to tactical environments", Military Communications Conference, 2011, Nov. 7, 2011, pp. 2205-2210.

* cited by examiner

MOBILE CELLULAR NETWORK BACKHAUL

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

A cellular network typically include multiple stationary eNodeBs, base stations, or the like, in different locations that communicate with a mobile telephone switching office (MTSO) and/or one or more core network components (generally referred to as the core or core network) that are remotely located from the different base stations. The MTSO or mobile core determines how calls are routed between the base stations and enables the base stations to communicate with each other for handover purposes. If a base station cannot communicate with the MTSO or mobile core, or the rest of the network, all communications at that base station are lost and user equipment (UE) in corresponding network areas cannot communicate with other UEs, even if the UEs trying to communicate with each other are in the same network area. In addition, the base stations are built to be stationary so that UEs within a particular area always have network access.

Furthermore, when a user moves from one network to another network, the mobile cores of the two networks communicate with each other to handle the handover and other configuration details (e.g., a core network component of the first cellular network communicates with a core network component of the second cellular network). In addition to communicating for handover purposes, core network components from different cellular networks may also communicate in order to route data (e.g., voice data, video data, application data, control data, etc.) from a user in a first cellular network to another user in a second cellular network. Due to the large number of users in each network, the amount of data that is transmitted between core network components, and the desire to free up wireless spectrum, it is preferable that the mobile cores communicate via wired communication. However, when wired communications are not available, in some instances, core network components can communicate via satellite and/or microwave transmissions.

Many locations throughout the world lack a network infrastructure that would enable users to communicate via a typical telephone or cellular network. In such locations it can be difficult for users to communicate effectively. Users must often rely on technologies that are more expensive, have lower bandwidth, or have limited use distances, such as satellite phones, half-duplex radio transceivers, etc. Furthermore, these locations often lack the resources to create the network infrastructure necessary for a cellular network, such as cell towers, base stations (or the like), switching stations, etc. In some circumstances, such as war zones, etc., building the network infrastructure for such communications is not feasible due to the transient nature of military personnel and equipment. For example, for a communications command center in a battlefield area, mobility can be an important feature to allow the command center to adapt to the changing battlefield conditions. Thus, stationary network technologies can be ineffective.

SUMMARY

One device that can be used to improve communications in such environments is a mobile cellular network (MCN) communication system, also referred to as a network-in-a-box (NIB). The NIB can include all of the components of a typical cellular network, but residing in one location (e.g., co-located, in the same room, container, rack, area, vehicle, etc.). Further, the NIB does not need to communicate with other nodes, base stations (or the like), or an MTSO to provide complete cellular network functionality to endpoints (e.g., UEs, servers, etc.) within a covered area. In addition, as the NIB moves, the network coverage moves with it. Thus, NIBs can create a cellular network within a limited area that allows user equipment (or other endpoints) within that area to communicate with each other. One example of a commercially available NIB, or MCN communication system, is the Xiphos™ available from Oceus Networks.

Furthermore, in some embodiments, where multiple MCN communication systems provide multiple mobile cellular networks, they can communicate with each other for handovers and data routing, etc.

DETAILED DESCRIPTION

Figure 1:
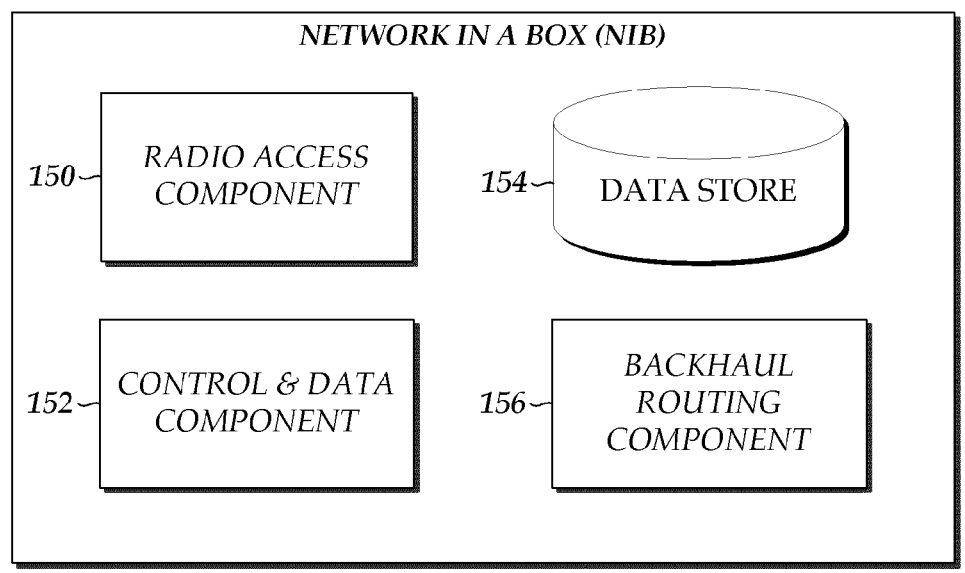
FIG. 1 is a block diagram of an embodiment of a MCN communication system.

MCN communication systems can be deployed in areas where cellular networks are not available. As mentioned previously, each MCN communication system can provide a portable, self-contained cellular network for devices in respective coverage areas. In some cases, such as when a device moves from one coverage area to another coverage area, or data is routed from a device in one coverage area to another coverage area, the mobile core network components of the MCN communication systems can communicate the relevant information to each other via a backhaul. The data that is communicated via the backhaul can include control plane data (e.g., data that relates to the control, configuration, and/or authentication of the coverage area and/or UEs in the coverage area) and/or data/user plane data (e.g., user traffic data, such as voice data, video data, application data, messaging data, etc.).

In some embodiments, the MCN communication systems, such as one or more mobile core network components, can use the same communication standard that is used to provide communication links to UEs or other devices in a particular coverage area to communicate with each other for backhaul communications. For example, if a MCN communication system provides a 4G LTE network to devices in a particular coverage area, the mobile core network components of the MCN communication system can communicate with the mobile core network components of another MCN communication system using the 4G LTE standard, as well. In this way, reliance on additional standards and/or technologies can be reduced and a common standard can be used for both end-user communications between a MCN communication system and UEs and for backhaul communications between MCN communication systems. In some instances, one or more of the MCN communication systems can communicate with other MCN communication systems, the Internet, or other network, using a different standard, such as satellite communication, etc.

In addition, in some embodiments, one or more MCN communication systems can register with another MCN communication system as UEs of the MCN communication system. In this way, communications to/from the one or more MCN communication systems and the other MCN communication system (e.g., backhaul communications) can be similar to communications between a UE and a MCN communication system.

Packets

In some embodiments, such as in an IP network architecture, the data that is transmitted to and from a MCN communication system can be in the form of IP data packets. In some embodiments, the packets can include a source identifier, a destination identifier, a network identifier, and/or one or more session identifiers. In certain embodiments, the packets do not include a source/destination identifier. For example, such as when a UE is registering with a MCN communication system, a packet can include a request to establish communication with a particular MCN communication system, but may not include a source/destination identifier for the particular MCN communication system or a destination identifier for the destination of the packet. In some cases, such as after a UE has registered or established communication with a MCN communication system, the packets may not include a network identifier. In such cases, the source/destination identifiers and/or the session identifiers can be for communications between an endpoint and a MCN communication system.

The source and destination identifiers can include, but are not limited to an address, such as an IP address or MAC address, or other identifier, that can identify the source and destination of the packet, respectively. In some embodiments, the source and/or destination can be a UE, a server, a MCN communication system (e.g., one or more of the components of a MCN communication system), etc.

The network identifier can include, but is not limited to an access point name, or other identifier that can identify the MCN communication system with which a UE wants to register (registered MCN). As a non-limiting example, a UE may be in the coverage area provided by a first MCN communication system (the local MCN), but the network identifier may indicate that a second MCN communication system is to process the packets from the UE. For instance, the UE may want to communicate with a server or another UE that is accessible via the second MCN communication system, but is not accessible via the first MCN communication system.

The session identifiers can include, but are not limited to tunnel endpoint IDs or other identifiers that can provide a communication pathway between a UE and the MCN with which it is registering or registered. For example, the session identifier can uniquely identify a UE within a covered area to the MCN communication system of the covered area (the local MCN), whether or not the UE is registered with the local MCN, and to the registered MCN. In some embodiments, the session identifiers can provide sufficient information to enable communications between a UE and the registered MCN regardless of the location of the UE. Furthermore, the session identifiers can include identifiers that enable the local MCN (whether it is the same or different from the registered MCN) and UE to identify each other and communicate directly.

As a non-limiting example, once a UE has registered with a MCN communication system (the registered MCN), the session identifiers can provide information regarding the location of the UE (e.g., the identity of the local MCN, such as when it is different from the registered MCN), how to access the UE (e.g., routing information), and/or unique identifiers that enable the UE to communicate with the local MCN and/or the registered MCN.

For example, if the local MCN is different from the registered MCN, the session identifiers can include IP addresses and/or routing information about the local MCN to the registered MCN and vice versa. With continued reference to the example, the session identifiers can be used by the local MCN to determine that all packets received from the UE are to be routed to/processed by the registered MCN.

As used herein, a user packet can refer to a packet that is communicated to/from an end user device, such as a server, UE, application, etc. from/to a MCN communication system. In some embodiments, a user packet can be communicated via wired or wireless communication. In certain embodiments, a user packet is communicated to a MCN communication using a wireless communication standard, such as, but not limited to 3G, 3GPP, 4G, 4G LTE, mobile WiMAX, etc.

As used herein, an inter-MCN packet can refer to a packet that includes a user packet embedded inside and is communicated between MCN communication systems and/or between components or subcomponents of a MCN communication system (e.g., from a PGW of one MCN communication system to a SGW of another MCN communication system, etc.). An inter-MCN packet can be transmitted via wired or wireless communication. In some embodiments, inter-MCN packets are communicated between MCN communication systems using general IP routing techniques and/or using typical backhaul communications (e.g., wired, satellite, microwave). In some instances, inter-MCN packets are used when communications are directed to a UE. In certain embodiments, inter-MCN packets are not used, or are omitted, for some communications directed to devices other than user equipment, such as servers, etc.

As used herein, a carrier packet can refer to a packet that includes a user packet and/or an inter-MCN packet embedded inside and is and is transmitted between MCN communication systems and/or between components or subcomponents of a MCN communication system (e.g., from a backhaul routing component of one MCN communication system to a backhaul routing component of another MCN communication system). In some embodiments, the carrier packet is communicated between MCN communication systems using a wireless standard that is similar to, or the same as, the wireless standard used to communicate user packets from a UE to a MCN communication system.

MCN Communication System

FIG. 1 is a block diagram of an embodiment of a MCN communication system 100 and at least some of its components. In the illustrated embodiment, the MCN communication system 100 includes a radio access component 150, which can be used to send/receive wireless communication to/from the MCN communication system, a control and data component 152, a data store 154, and a backhaul routing component 156. The MCN communication system 100 can further include and/or can communicate with an antenna, satellite dish, and the like, to receive data from UEs, other MCN communication systems, satellites, and the like. In certain embodiments, the MCN communication system 100 can communicate with multiple eNodeBs, base stations, or the like, to increase its coverage area. In addition, as mentioned above, in an IP network architecture, the received/transmitted data can all be in the form of IP data packets.

In some embodiments, each of the components of the MCN communication system 100 can include an identifier, such as an IP address, MAC address, etc. Furthermore, in certain embodiments, the MCN provided by the MCN communication system can include a network identifier, such as an access point name. As mentioned, above, packets can use the network identifier of the MCN communication system to identify the MCN communication that is to process the packet and/or that can access a particular destination, etc.

In some embodiments, the MCN communication system can function in an independent mode where communication with other MCN communication systems or a backhaul communication is limited or non-existent. In such embodiments, upon receiving a packet of data, the first MCN communication system can refer to a look-up table stored in a data storage device to determine whether a destination identifier of the packet is within its covered area. If the destination is within the covered area (e.g., another UE within the covered area, a component of the MCN communication system, etc.), the MCN communication system can transmit the data to the destination. The data can include any one or more types of communications, including, but not limited to, user plane data (e.g., voice data, video data, e-mail, SMS data, picture data, files, requests for information, etc.) or control plane data. If the first MCN communication system determines that the destination is not within its covered, the first MCN communication system can transmit a message to the source that communication with the destination is not available, etc.

The MCN communication system can also function in a networked mode such that communication with a destination is available even if the destination is not located within the MCN communication system's covered area. In some instances, the destination may be accessible via the Internet (e.g., via satellite or wired communication) or microwave communication, or may be accessible at another MCN communication system that is related to the MCN communication system and/or is accessible without using a typical backhaul link.

As will be described in greater detail below, when in the networked mode, multiple MCN communication systems can be related together. When related together, in some embodiments, backhaul communications between the MCN communication systems can be done using the same wireless standard or technology as communications between a UE and a MCN communication system 100. In addition, in certain embodiments, when in the networked mode multiple MCN communication systems can be associated together and/or networked together as described in greater detail in U.S. application Ser. No. 13/972,112, filed Aug. 21, 2013, entitled MOBILE CELLULAR NETWORKS, incorporated herein by reference in its entirety.

Furthermore, when related together, the MCN communication systems can have different functionality depending on their relationship with the other MCN communication systems. For example, as described in greater detail below with reference to the backhaul routing component 156, when related together, one of the MCN communication systems can be designated as a host MCN communication system, while the remaining MCN communication systems can be designated as client MCN communication systems and/or relay MCN communication systems.

In some embodiments, the client and relay MCN communication systems can be related to the host MCN communications system by being registered to the host MCN communication system, similar to the way in which UEs are registered with a MCN communication system. In such embodiments, the host MCN communication system can communicate with the client and relay MCN communication systems as UEs of the host MCN communication system (e.g., packets to/from the client and relay MCN communication systems can be treated similar to the way packets from UEs registered with the host MCN communication system are treated, etc.).

Furthermore, in some instance, by registering the client and relay the MCN communication systems with the host MCN communication system as UEs, a UE can move from the covered area of a first MCN communication system to the covered area of a second MCN communication system without disrupting the service of the UE. As the UE moves from the first MCN communication system to the second MCN communication system, the first and second MCN communication system an effectuate a handover that updates which MCN communication system is the local MCN for the UE. The registered MCN for the UE can similarly update its routing table and any session identifiers in order to continue providing a communication pathway or link for the UE.

As part of the registration, the client and relay MCN communications systems can share one or more identifiers with the host MCN communication system. The one or more identifiers can correspond to components or subcomponents of the client/relay MCN communication system and/or to servers or other devices with which the client/relay MCN communication system can communicate (e.g., a server that has wired communication with the client/relay MCN communication system). The host MCN communication system can use the identifiers to generate a routing table that can be used when a destination of a packet corresponds to the component, subcomponent, server, or other device that can be accessed via the client/relay MCN communication system. In a similar manner, client MCN communication systems can be registered with relay MCN communication systems.

With continued reference to FIG. 1, the control and data component 152 can be implemented using one or more computer processors, FPGAs, microcontrollers, etc., and can perform the various operations of the MCN communication system 100. In an IP network architecture, such as 4G LTE, the control and data component 152 can include a packet data network gateway (PGW), serving gateway (SGW), mobility management entity (MME), and policy and charging rules function (PCRF).

The PGW can provide the IP traffic interface between the UE and external IP networks. Together with the SGW, the PGW can route all IP packets between the UE and the external IP network. The PGW can perform policy enforcement, packet filtering for each UE, charging support, packet screening, quality of service, EPS network support, static policy, IPv4 packet data network (PDN), and network address support. The PGW can also provide support for mobility between 3GPP and non-3GPP technologies such as WiMAX and 3GPP2, etc.

The SGW can route and forward user data packets, and work with the PGW to handle user data between the radio access component and external IP networks. The SGW can route the user data from the UE to the PGW or from the PGW to the UE, and provide support during inter-MCN communication system handovers. For idle state UEs, the SGW can terminate the downlink data path and trigger paging when downlink data arrives for the UE. The SGW can also manage and store UE contexts, e.g. parameters of the IP bearer service, network internal routing information.

The MME can be responsible for attaching and detaching a UE from the MCN communication system and authenticating the user (by interacting with the home subscriber server (HSS), described in greater detail below). Furthermore, the MME can be responsible for choosing the SGW and PGW for a UE, and can manage PDN connections. In addition, the MME can be responsible for UE tracking and paging procedures including retransmissions.

The PCRF can provide network control regarding the service data flow detection, gating, quality of service, and flow based charging towards a Policy and Charging Enforcement Function (PCEF) contained in the PGW. The PCRF can contain a database holding dynamic policy and charging rules information for the MCN communication system.

Similarly, the control and data component 152 can perform the attachment and detachment of UEs, authentication procedures, gateway selection, managing PDN connections, UE tracking and paging, etc. The control and data component 152 can also handle the user data between the radio access component and an external IP network, packet routing and forwarding, handover functions between MCN communication systems, packet buffering initiation of network triggered service request procedures, quality of service policy enforcement, static policy, subscriber location management, subscriber data, and the like. In addition, the control and data component 152 can perform additional procedures as described in greater detail in U.S. application Ser. No. 13/972,112, previously incorporated herein by reference.

The data store 154 can include data regarding the UEs in communication with the MCN communication system 100 and within the coverage area corresponding to the MCN communication system 100, such as UE location, authentication keys, etc. In some embodiments, such as an IP network architecture, such as a 4G LTE network, the data store 154 can include a home subscriber server (HSS). In addition, the data store 154 can include information regarding other MCN communication systems 100 that are related to the MCN communication system 100.

The HSS can include subscription information for all UEs (including client MCN communications systems that are registered as UEs) associated with the MCN communication system, such as all the UEs located within the covered area of a MCN communication system and/or the UEs located within the covered area of related or associated MCN communications systems. The HSS can store, for example, authentication parameters, security keys, and subscription information for UEs within the MCN of the MCN communication system or associated with the MCN communication system. Furthermore, the HSS can include subscriber location information and be involved with subscriber data handling, authentication procedures, etc.

Similarly, the data store 154 can further include data identifying other related MCN communication systems. In some cases, the data identifying the other related MCN communication systems can be used to communicate with the other MCN communication systems.

As a non-limiting example, if the MCN communication system 100 is a host MCN communication system, the data store 154 can include data identifying one or more client or relay MCN communication systems of the host MCN communication system, other host MCN communication systems, clients of other host MCN communication systems, standalone MCN communication systems, etc., with which the MCN communication system can communicate (e.g., forward data to or receive data from). In addition, the data can include information regarding one or more devices that are in communication with the client/relay MCN communication systems, such as servers that are co-located and/or in communication with the client/relay MCN communication system.

The information in the data store 154 regarding the other MCNs can enable the MCN communication system 100 to communicate with the other MCN communication systems and/or the devices in communication with the other MCN communication systems. For example, the information in the data store 154 can include a routing table on how a particular MCN communication system can be reached (e.g., an IP address for the MCN communication system and/or an IP address of a MCN communication system that can communicate with the MCN communication system), how a server that is co-located with a particular MCN communication system can be reached, etc. Additional information can be stored in the data store 154, as described in greater detail in U.S. application Ser. No. 13/972,112, previously incorporated herein by reference.

In some embodiments, if the MCN communication system is a client MCN communication system, the data store 154 can include data identifying the host MCN communication system to which the client MCN communication system is related and/or any relay MCN communication system that can be used to communicate with the host MCN communication system. For example, in some embodiments, a client MCN communication system can include data similar to a UE that is registered with the host MCN communication system that allows the client MCN communication system to communicate with the host MCN communication system as a UE of the host MCN communication system.

In certain embodiments, such as when the MCN communication system is a relay MCN communication system, the data store 154 can include data identifying one or more client or other relay MCN communication systems with which it can communicate, the host MCN communication system to which the relay MCN communication system is related, and/or any additional relay MCN communication system that can be used to communicate with the host MCN communication system.

The backhaul routing component 156, which can also be referred to as a routing module, can be implemented using one or more computer processors, FPGAs, microcontrollers, etc., and can perform various operations of the MCN communication system 100. In some embodiments, the backhaul routing component 156 can be implemented as part of the control and data component 154 and/or can be implemented separately.

In certain embodiments, the backhaul routing component 156 can be used to perform the various functions identified herein as being performed by a host MCN communication system, relay MCN communication system, and/or client MCN communication system.

Host/Relay/Client MCN Communication Systems

For example, when a MCN communication system operates as a client MCN communication system, it can, in addition to providing an independent network to devices within its MCN, include information regarding other MCN communication systems as discussed in greater detail below (e.g., routing or identifier information of a host or relay MCN communication system, or for a local MCN, or registered MCN, etc.). In addition, as will be described in greater detail below, when in a client mode, the MCN communication system can unencapsulate carrier and/or inter-MCN packets received from host or relay MCN communication systems, communicate user packets to UEs, servers, or other devices, within the MCN provided by the client MCN communication system, identify a requested MCN (described in greater detail below) for a user packet, encapsulate user packets from devices that are to be processed by other MCN communication systems into inter-MCN packets and/or carrier packets, and/or communicate the carrier packets to a host or relay MCN communication system. In some embodiments, the client MCN communication system can communicate the user packet and/or inter-MCN packets over a traditional backhaul link to a destination on the Internet, etc. Any combination of the aforementioned embodiments can be used as desired.

Relay MCN communication systems can, in addition to providing an independent network to devices within its MCN, be used to provide communication pathways between a client or another relay MCN communication system and the host MCN communication system. When operating in a relay mode, the MCN communication system can include information regarding other MCN communication systems as discussed in greater detail below (e.g., routing or identifier information for a host MCN communication system, one or more relay and/or client MCN communication systems, and/or for a local MCN or registered MCN, etc.). In addition, as will be described in greater detail below, when in a relay mode, the MCN communication system can perform all of the functions of a client MCN communication system, as well as some additional functions. For example, a relay MCN communication system can unencapsulate carrier and/or inter-MCN packets received from other relay and/or host or client MCN communication systems, communicate user packets to UEs within the MCN provided by the relay MCN communication system, determine how to route an user and inter-MCN packets to another MCN communication system, encapsulate user and/or inter-MCN packets into a new carrier packet, and/or transmit the new carrier packet to a host, client, or another relay MCN communication system.

In certain embodiments, a relay MCN communication system can determine that a carrier packet is meant for a host MCN communication system or a particular client MCN communication system without unencapsulating the carrier packet. In such embodiments, the relay MCN communication system can simply forward the carrier packet without examining the inter-MCN and/or user packet. For example, in some instances, a destination identifier for a carrier packet can be a host MCN communication system and the source identifier can be a client MCN communication system (or vice versa). In such instances, the relay MCN communication system can simply forward the packet to or towards the MCN communication system identified by the destination identifier. In this way, the relay MCN communication system can forward the carrier packet without having to analyze the inter-MCN and/or user packet. In some embodiments, a relay MCN communication system can embed a carrier packet into an additional carrier packet. In certain embodiments, the relay MCN communication system can communicate the inter-MCN and/or user packet over a traditional backhaul link to a destination on the Internet, or another network etc. In some embodiments, the relay MCN communication system can act as a host MCN communication system to a client MCN communication system, while acting as a client MCN communication system to a host MCN communication system. Any combination of the aforementioned embodiments can be used as desired.

Host MCN communication systems can, in addition to providing an independent network to devices within its MCN, provide communication pathways between it and related client MCN communication systems and/or from one client MCN communication system to another MCN communication system (e.g., another client MCN communication system, another host MCN communication system and/or a standalone MCN communication system). In some embodiments, a host MCN communication system can include the information regarding other MCN communication systems as discussed in greater detail below (e.g., routing and/or identifier information for client, relay, standalone, other host, unrelated MCN communication systems, and/or for a local MCN or registered MCN, etc.).

In addition, as will be described in greater detail below, when in a host mode, the MCN communication system can perform any one or all of the functions described above with reference to the client or relay MCN communication system. For example, the host MCN communication system can encapsulate user packets from UEs that are to be processed by other MCN communication systems into inter-MCN and/or carrier packets, unencapsulate inter-MCN and/or carrier packets received from relay or client MCN communication systems, communicate user packets to UEs within the MCN provided by the host MCN communication system, determine how to route a user and/or inter-MCN packet to another MCN communication system, identify the MCN communication system requested by a user and/or inter-MCN packet to process the user and/or inter-MCN packet (the requested MCN), encapsulate the user and/or inter-MCN packet into a new carrier packet, and/or transmit the new carrier packet. In some embodiments, the host MCN communication system can communicate the inter-MCN and/or user packet over a traditional backhaul link to another host MCN communication system, a standalone MCN communication system, or other destination. Any combination of the aforementioned embodiments can be used as desired.

Each MCN communication system 100 can include fewer, more, or different components as desired. For example, the control and data component 152 and the backhaul routing component 156 can be implemented as a single component, etc. Furthermore, the MCN communication system can include multiple radio access components 150, multiple control and data components 152, multiple data stores 154, and/or multiple backhaul routing components 156, etc., as desired.

As used herein, the requested MCN can be based at least in part on the destination of a packet. For user packets to/from a UE, the requested MCN can refer to the local MCN of a UE and/or the registered MCN of a UE. For example, for communications from a UE to a MCN communication system, the requested MCN can refer to the registered MCN of the UE. For communications from a MCN communication system to a UE, the requested MCN can refer to the local MCN of the UE. For user packets directed to servers and other devices, the requested MCN can refer to the MCN communication system with which the server can communicate directly or via a typical backhaul, and/or the MCN communication system with which the server is registered. For example, the requested MCN can be the MCN communication system with which the server is co-located or in the same building, tent, room, etc. For inter-MCN packets and carrier packets, the requested MCN can refer to the MCN communication system that is to process the packet. Accordingly, the meaning of the requested MCN can vary depending on its context. Furthermore, it will be understood that any one or any combination of the above-referenced embodiments can be used as desired.

Related MCN Communication Systems

Figure 2:
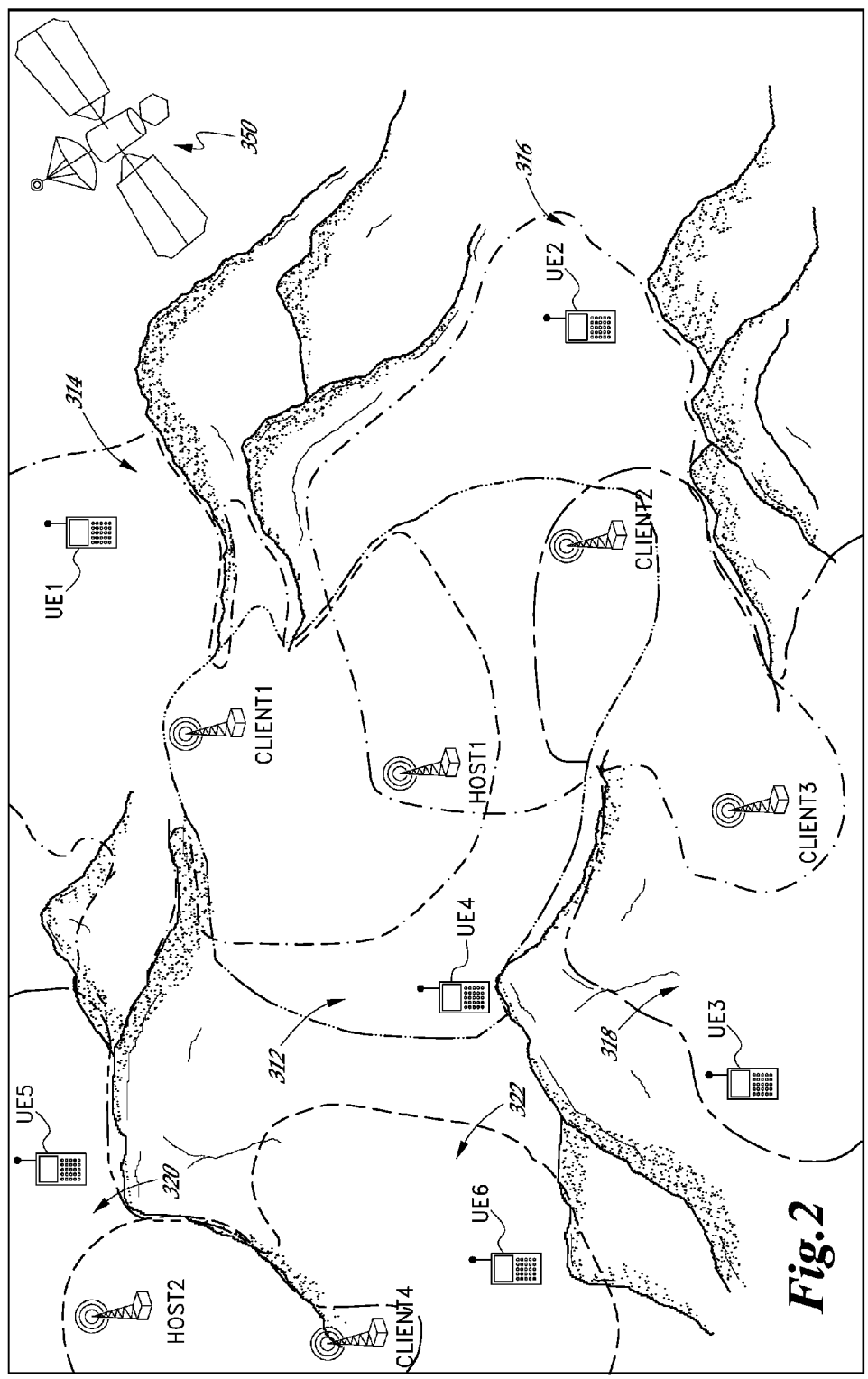
FIG. 2 is a diagram of two sets of related MCN communication systems and their respective MCNs.

FIG. 2 is a diagram of an embodiment of two sets of related MCN communication systems. The first set of related MCN communication systems includes a host MCN communication system (Host1) and client MCN communication systems (Client1, Client2, and Client3). Host1 and Clients 1-3 can each provide a corresponding MCN 312, 314, 316, 318, respectively. In addition, in the illustrated embodiment at least one user equipment (UE) UE1, UE2, UE3, UE4 is located in each MCN 314, 316, 318, and 312, respectively.

The second set of related MCN communication systems can include a host MCN communication system (Host2) and a client MCN communication system (Client4). The Host2 provides MCN 320 and Client4 provides MCN 322. In addition, UE5 is located within MCN 320 and UE6 is located within MCN 322.

Each UE can be registered with one or more MCN communication systems. Prior to registration with a MCN communication system, the UE can communicate with the MCN communication system using session identifiers or other identifiers. Once registered with a MCN communication system (registered MCN), the registered MCN can process packets to/from the UE and communicate with the UE using source/destination identifiers, such as IP addresses, and/or the session identifiers, etc.

In some embodiments, a UE can be located in the MCN of one MCN communication system (local MCN), but registered with a different MCN communication system (registered MCN). In such cases, packets to/from the UE can be forwarded to the registered MCN for processing. In addition, communications between the UE and the local MCN can be carried out using session identifiers or other identifiers that can be different from the source/destination identifiers used for communications between the UE and the registered MCN.

In certain embodiments, a UE can be registered with multiple MCN communication systems. For example, in some embodiments, the different MCN communication systems can have different applications that are only accessible to it and UEs that are registered with it. Accordingly, the UE can use different source identifiers depending on which registered MCN and/or destination the UE is requesting to use or access.

With continued reference to FIG. 2, In the illustrated embodiment, Host1, Host2, and Clients 1-4 are illustrated as being located on the ground. However, it will be understood that any one or more of the MCN communication systems can be located on a moving object, such as an airplane, drone, automobile, ship, boat, balloon, or other vehicle.

In some embodiments, the MCN communication systems that are related can communicate with each other in a manner similar to the way in which UEs communicate with a particular MCN communication system (e.g., for backhaul communications). For example, in some embodiments, Clients 1-3 can be configured to appear to Host1 as UEs and Client4 can be configured to appear as a UE to Host2 In some embodiments, Client3 can be configured to appear to Client2 as a UE. Accordingly, backhaul communications, which would typically be carried out via satellite, microwave, or wired communications can be carried out using a wireless standard that is similar to, or the same as, the wireless standard used between a MCN communication system and a UE, such as those used in a one-to-many configuration (e.g., 3G, 4G LTE, mobile WiMAX, etc.).

In certain embodiments, the various MCN communication systems Host1 Host2 Clients 1-4, can also communicate with each using a typical point-to-point backhaul standard, such as any one, or a combination, of wired communication, satellite communication, microwave or radio wave communication, OFDM, fixed WiMAX, etc.

In addition to being related, the various MCN communication systems Host1, Host2, Clients 1-4 (or any subset or combination thereof) can be organized as a network of MCN communication systems, as described in greater detail in U.S. application Ser. No. 13/972,112, previously incorporated herein by reference.

The MCN communication systems (e.g., Host1 and Clients 1-3 and/or Host2 and Client4) can be related together using one or more unique identifiers, such as IP addresses, MAC addresses, device names, random numbers, access point names, etc. For example, Host1 can store identifiers for each of Clients 1-3 and vice versa. Similarly, Host2 can store one or more identifiers for Client4and vice versa.

In some embodiments each MCN communication system can include a single identifier or multiple identifiers. Moreover, the identifier(s) for each MCN communication system can include a single identifier or multiple identifiers for the different components (or subcomponents) of the MCN communication systems. For example, each of the MCN communication systems can include a single identifier or separate identifiers for one or more of their respective components (e.g., the radio access component 150, the control and data component 152, the data store 154, and the backhaul routing component 156). In some cases, subcomponents of the components can have unique identifiers (e.g., the PGW, SGW, HSS, MME, etc., of the control and data component 152 or data store 154).

In some embodiments, Host1 can share all of the identifiers of Clients 1-3 with Clients1-3. In certain embodiments, Host1 can share a subset of the identifiers with Clients1-3. For example, Host1 can share one or more of its own identifiers (e.g., access point name and/or an identifier for one or more of the radio access component 150, the control and data component 152, the data store 154, and the backhaul routing component 156) with Clients 1-3. In some embodiments, Host1 only shares a single identifier with Clients1-3, such as the identifier for the backhaul routing component 156 of Host1 In certain embodiments, Host1 does not share the identifiers of Clients1-3 with Clients 1-3.

In some embodiments, the MCN communication systems can be related based on user input. In certain embodiments, the MCN communication systems (e.g., Host1 and Clients1-3) can be automatically related together based on one or more factors. For example, the MCN communication systems can be related based on their proximity, radio communications, and/or location, etc.

In some embodiments, Host1 can perform a search for other MCN communication systems within its covered area by broadcasting a query for other MCN communication systems to answer. The MCN communication systems that respond can be related to Host1 as clients. For example, in the illustrated embodiment, Client1and Client2 can respond. As mentioned, previously, in some cases, Client1and Client2can register with Host1 as UEs.

Similarly, Client1and Client2can broadcast a query for other MCN communication systems. The MCN communication systems that respond to their queries can be related to Host1 as clients and/or as clients to the respective client that sent out the broadcast. For example, in the illustrated embodiment, when Client2 sends out the broadcast query, Client3 can respond as it is within the coverage area 316 of Client2. Client3 can then be related to Host1 as a client. In such an instance, Host1 can track that to communicate with Client3, it can use Client2.

In certain embodiments, when Client1, Client2, and/or Client3 are activated, they can, in addition to providing an independent network to devices within their respective MCNs, look for a host MCN communication system. Once found, Client1, Client2, and/or Client3 can register with Host1 similar to the manner in which UEs register with a MCN communication system. As mentioned above, in some embodiments, when Client3 is activated, it can register with Client2 as a UE of Client2.

In some instances, Client3 can be associated with Client2 as a client of Client2. Host1 can store the relationship information of Client2 and Client3 for future reference. In some embodiments where a MCN communication system is used as a client MCN communication system to one MCN communication system and a host MCN communication system to another MCN communication system, the MCN communication system can be identified as a relay MCN communication system. Accordingly, in certain embodiments, a relay MCN communication system can include functionality of both a host MCN communication system and a client MCN communication system. In the illustrated embodiment of FIG. 2, Client2 can be identified as a relay MCN communication system (e.g., a host to Client3 and a client to Host1).

In some embodiments, as part of the detection and or registration process, Host1 can perform a security check to determine whether it can be related to the other Clients1-3. If Clients1-3 pass the security check, Host1 can be related to form a set. In certain embodiments, upon detection, Host1 and Clients1-3 are related together without a security check.

Once Host1 and Clients1-3 have been related, in some embodiments, a user can select one of them to be the host. In the illustrated embodiment, Host1 is selected as the host. The Clients1-3 can then be identified as clients or relays. However, any one of Host1 or Clients1-3 can be selected as the host.

In certain embodiments, the host can be selected, or identified, automatically based on one or more factors. For example, Host1 can be selected based on its elevation. The elevation can be obtained from a GPS unit or similar device. For example, coverage areas corresponding to MCN communication systems at higher elevations can have a greater coverage area and therefore be more desirable as a host. Further, in battlefield conditions, MCN communication systems at higher elevations may be safer. Accordingly, in some embodiments, the MCN communication system at a higher elevation or the highest elevation can be selected as the host. In certain embodiments, the MCN communication system at a lower elevation, or the lowest elevation, can be selected as the host.

In some embodiments, the host is selected based on which MCN communication system has the strongest and/or most reliable connection with a backhaul link. In certain embodiments, the Host1 can be selected based on the range of the corresponding coverage area. The MCN communication systems can analyze radio strength, frequency spectrum, surrounding terrain features (e.g., elevation changes, climate, etc.), and other factors to estimate the range of the different coverage areas. The terrain features can be obtained by determining the location of the MCN communication systems using a global-positioning satellite system (GPS) or other location identification system and using one or more maps, such as a topographical map, etc. In some embodiments, the MCN communication system corresponding to the coverage area with the largest coverage area can be selected as the host. In certain embodiments, the coverage area with the smallest range or middle range can be selected as the host. In certain embodiments, Host1 can be selected based on its location. For example, the MCN communication system that is closest to or farthest away from a command center can be selected as the host. Location information of the command center can be compared with location information of the MCN communication systems to determine the distance between them.

Furthermore, the host can be selected based on an identifier of the MCN communication systems and/or an identifier of the group associated with the MCN communication system. For example, the MCN communication system associated with a company commander can be automatically designated as the host.

Host1 can obtain various types of information from Clients1-3. For example, in some embodiments, Host1 can obtain the UE information regarding the UEs in the different coverage areas 312, 314, 316, 318. Host1 can also obtain additional information from Clients1-3, such as the location of each Clients1-3, network configuration parameters, error information, and the like. In some instances, Host1 can obtain identification information regarding Clients1-3. For example, Host1 can obtain identifiers, such as IP addresses for the various component and subcomponents of Clients1-3. In some instances, Host1 can obtain network identifiers of Clients1-3, such as access point names, etc. In some embodiments, Host1 does not obtain any information from Clients1-3, but simply passes information along to Clients1-3, such as identification information for Host1 In some cases, some or all of the information regarding Clients1-3 is provided to Host1 by a user.

In addition, Host1 can generate data that can be shared between Host1 and Clients1-3 Host1 can transmit some or all of the generated data to Clients1-3 In this way, Host1 and Clients1-3 can include all of the information regarding each other. In some embodiments, the shared data includes all the data found on Host1 including information regarding other MCN communication systems that are not related to Host1 and Clients1-3 such as information regarding Host2 and Client4. In certain embodiments, Host1 only shares identification information that enables Clients1-3 to communicate with Host1 (e.g., a network identifier and/or one or more destination identifiers for the components/subcomponents of Host1).

Additional MCN communication systems can be related to Host1 as desired. In some embodiments, a user can relate a new MCN communication system to Host1 and Clients1-3 In certain embodiments, a new MCN communication system can be added based on the factors described above, such as proximity to Host1 hierarchical information, user input, etc. In some cases, Host1 can retrieve and/or receive identification information from the new MCN communication system. In certain embodiments, Host1 receives the identification information from a user prior to, or after, communicating with the new MCN communication system. Host1 can update its data and, in some embodiments, can transmit the some of the data to one or more of Clients1-3 and the new MCN communication system. For example, if the new MCN communication system is to be a client MCN communication system of Client2 (e.g., Client2 can act as a relay between the new MCN communication system and Host1), Host1 can transmit the relevant information to Client2, etc.

As conditions change, such as Host1 or Clients1-3 moving, Host1 can update any relevant information, such as whether a client is no longer within the coverage area of Host1 whether a client requires a relay to communicate with Host1 and/or whether a client is now acting as a relay for another client, etc. In certain embodiments, Host1 can treat movement of Clients1-3 in a manner similar to which it handles the movement of its UEs.

In addition, in some embodiments, when a client MCN communication system moves from the covered area of a first host MCN communication system to the covered area of a second host (or relay) MCN communication system, the client MCN communication system can register with the second host MCN communication system and/or unregister with the first MCN communication system.

In some instances, the client MCN communication system can detect that the radio signal from the first host MCN communication system is decreasing and/or that the radio signal from the second MCN communication system is increasing. Based at least in part on the detected radio signals of the first and/or second host MCN communication systems, the client MCN communication system can change the MCN communication system with which it is registered. In certain embodiments, the client and/or host MCN communication systems can change with which host MCN communication system the client MCN communication system is registered based at least in part on a detected location of the client, first host, and/or second host MCN communication system.

Communication Routing Examples

Host1 can allow backhaul communications between it and Clients1-3 (and their UEs). In some embodiments the backhaul communications are provided without having to access a typical backhaul link, such as a satellite, a microwave antennae, a wired link, etc. In certain embodiments, the backhaul communications are provided using a similar, or the same, wireless standard that is used to provide communications between a MCN communication system and a UE.

FIGS. 3A-3F provide various non-limiting examples of how backhaul communications can be provided between various MCN communication systems. Although several embodiments illustrate communications between UEs located within the MCNs, it will be understood that similar communications can occur with servers or other devices that are accessible via the MCN communication systems and/or the components of the MCN communication systems, etc. Furthermore, it will be understood that one or any combination of the embodiments described with reference to FIGS. 3A-3F can be used as desired.

Figure 3A:
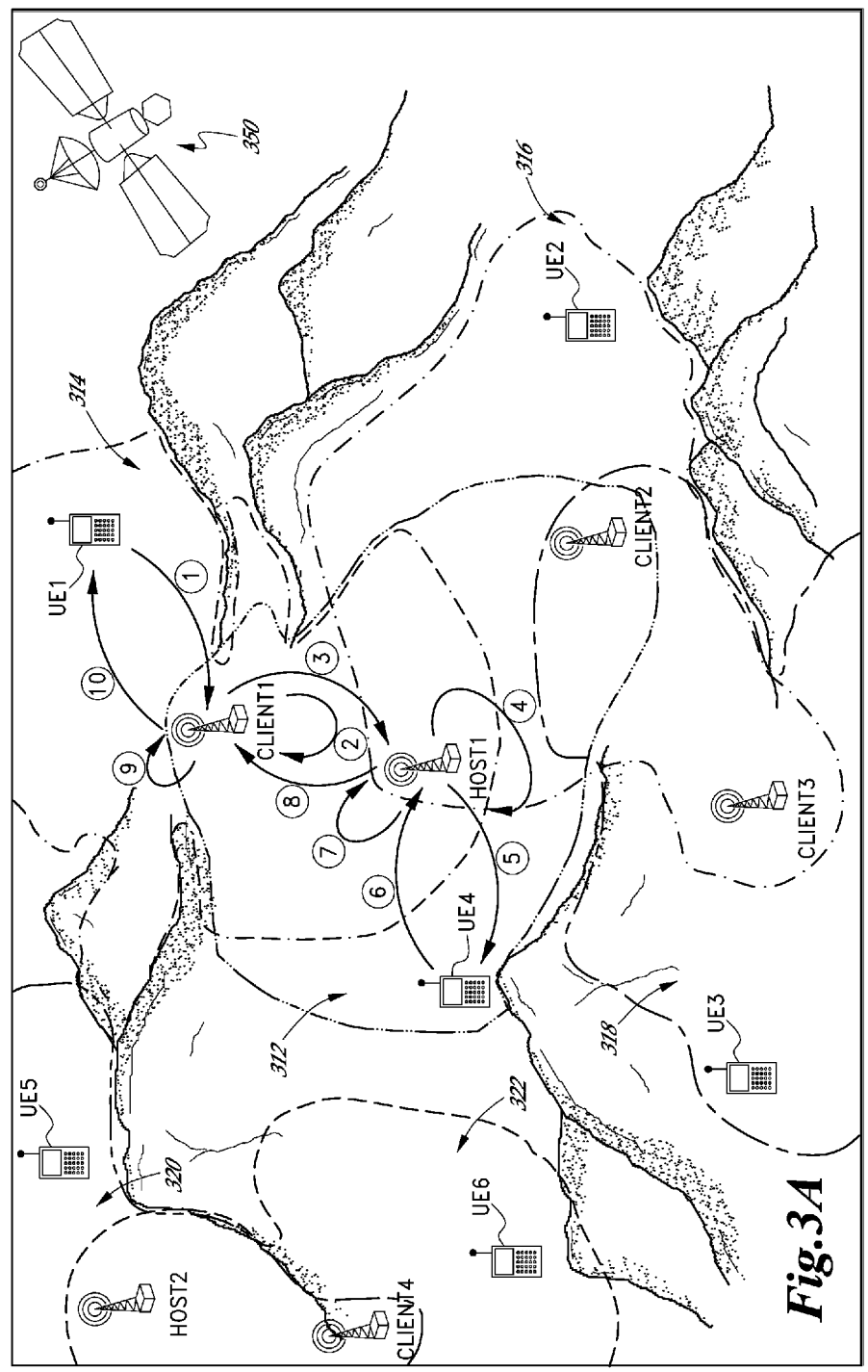
FIGS. 3A-3F are data flow diagrams illustrating various non-limiting embodiments of backhaul communications between various MCN communication systems.

In the illustrated embodiment of FIG. 3A, communications between a UE1 (located in MCN 314 and registered with Host1) and UE4 (located in MCN 312 and registered with Host1) are illustrated. It will be understood that as part of being registered with Host1 one or more session identifiers related to UE1 can be generated and stored at Client1 and/or Host1 The session identifiers can identify that Client1 is the local MCN for UE1 and that Host1 is the registered MCN for UE1. The session identifiers can be used by Client1 to communicate directly with UE1 and route data to Host1 and can be used by Host1 to route data to UE1.

Similarly one or more session identifiers related to UE4 can be generated and stored at Host1 The session identifiers related to UE4 can identify that Host1 is the local MCN and the registered MCN for UE4, and can be used by Host1 to communicate directly with and route data to UE4. Furthermore, it will be understood that as the UEs and/or MCN communication systems move, the session identifiers can be updated to reflect any changes to the local MCN and the registered MCN for the UEs.

Furthermore, as mentioned previously, Client1 can be considered, and treated as, a UE from Host1's perspective. Accordingly, as part of Client1's registration with or relationship to Host1 session identifiers can be generated that enable direct communication between the two MCN communication systems. In addition as described previously, the communication between Client1 and Host1 can be treated similar to, or the same, as communications between UE1 and Client1 and/or UE4 and Host1 etc.

At (1), the UE1 transmits a user packet to Client1. In the illustrated embodiment, the user packet can include a source identifier identifying UE1, a destination identifier identifying UE4, and/or a session identifier for communications between UE1 and Host1 (the registered MCN of UE1). The Client1 (2) processes the user packet and determines based at least in part on data regarding UE1 that was stored when UE1 registered with Host1 (e.g., the session identifier), that Host1 is to process the user packet. In some instances, Client1 can determine that Host1 is the registered MCN by comparing the session identifier received from UE1 with a table of session identifiers of UEs that are located within the MCN 314.

Based at least in part on the determination that another MCN communication system is to process the user packet, the identification of the registered MCN, and/or the one or more sessions identifiers, Client1 can embed the user packet into an inter-MCN packet. The inter-MCN packet can include a source identifier identifying Client1 (e.g., one or more of its components), a destination identifier identifying Host1 (e.g., one or more of its components), and the same session identifier that was included in the user packet.

In addition, based at least in part on the determination that another MCN communication is to process the user packet, Client1 can embed the inter-MCN packet into a carrier packet and (3) transmit the carrier packet to Host1 The carrier packet can include a source identifier identifying Client1 (e.g., one or more of its components), a destination identifier identifying Host1 (e.g., one or more of its components), and the session identifier that is used for communications between Client1 and Host1.

In some embodiments, the destination identifier in the carrier packet is different than the destination identifier of the inter-MCN packet. For example, in some instances, the destination identifier of the inter-MCN packet can be the control and data component 152 or one of its subcomponents (e.g., the PGW or SGW) of Host1 and the destination identifier of the carrier packet can be the backhaul routing component 156 of Host1.

Similarly, in certain embodiments, the source identifier in the carrier packet can be different than the source identifier of the inter-MCN packet. For example, in some instances, the source identifier of the inter-MCN packet can be the control and data component 152 or one of its subcomponents (e.g., the PGW or SGW) of Client1, and the source identifier of the carrier packet can be the backhaul routing component 156 of Client1.

As mentioned previously, in some embodiments, the session identifier of the carrier packet can be generated when Client1 registers with and/or is related to Host1 and/or is different from the session identifier in the inter-MCN and/or user packet. As described previously, in some cases, the carrier packet is communicated to Host1 using the same, or similar, wireless standard or technology that is used to (1) communicate the user packet from UE1 to Client1. For example, as described above, Client1 can be registered with Host1 as a UE of Host1.

Host1 (4) can process the carrier packet similar to the manner in which it processes user packets from UE4. For example, Host1 can analyze the session identifier of the carrier packet to determine that it is to process the packet. In addition, as part of the processing, Host1 can determine that there is an embedded packet. In some embodiments, Host1 can determine that the carrier packet includes an embedded packet by analyzing any one or any combination of the source identifier of the packet, the destination identifier of the packet, the source identifier of the packet, and/or one or more flags in the packet, etc. For example, if Host1 determines that the source identifier of the packet matches an identifier of a related MCN communication system (or one of its components), that the destination identifier matches an identifier for Host1 (or one of its components), the session identifier of Host1 matches packet particular session identifier, and/or a flag is set indicating an embedded packet, Host1 can determine that the carrier packet includes an embedded packet.

In the illustrated embodiment of FIG. 3A, Host1 determines that the carrier packet includes an embedded packet, and unencapsulates and processes the inter-MCN packet. As part of the processing the inter-MCN packet, Host1 can determine that it is the destination of the inter-MCN packet. In some embodiments, to determine that it is the destination of the inter-MCN packet, Host1 can analyze the destination identifier of the inter-MCN packet and/or the session identifier of the inter-MCN packet. In addition, as part of the processing, Host1 can determine that there is another embedded packet.

Based at least in part on its determination, Host1 can unencapsulate and process the user packet. As part of the processing, Host1 can determine that it is the registered MCN. In some embodiments, it can determine that it is the registered MCN based at least in part on the session identifier and/or the source identifier of the user packet. In addition, Host1 can analyze the destination identifier to determine that the destination (UE4) is accessible via Host1 In some embodiments, Host1 can use a lookup table to identify a session identifier that corresponds to the destination identifier (e.g., the session identifier used for communications between UE4 and Host1). Based at least in part on the session identifier that corresponds to UE4, Host1 can determine that it is the local MCN and registered MCN for UE4. Accordingly, Host1 can (5) transmit the unencapsulated packet to the UE4. In some embodiments, Host1 can transmit the user packet based at least in part on the session identifier that corresponds to UE4.

At (6), the UE4 communicates a user packet to Host1 The user packet can include a source identifier identifying UE4, a destination identifier identifying UE1, and/or the session identifier used for communications between UE4 and Host1. Host1 can (7) process the user packet. As part of the processing, Host1 can determine that it is the registered MCN, but can also determine that UE1 is located within the MCN of Client1 (e.g., is not directly accessible to Host1). In some embodiments, Host1 determines that it is the registered MCN based at least in part on the session identifier associated with the source identifier and/or the destination identifier, and determines that Client1 is the local MCN for UE1 based at least in part on the session identifier associated with the destination identifier.

Based at least in part on the determination that Client1 is the local MCN for UE1, Host1 can encapsulate the user packet into an inter-MCN packet. The inter-MCN packet can include a source identifier (Host1), a destination identifier (Client1) and/or a session identifier (session identifier for communications between UE1 and Host1). Based at least in part on the destination identifier and/or the session identifier of the inter-MCN packet, Host1 can encapsulate the inter-MCN packet into a carrier packet. The carrier packet can include a source identifier identifying Host1 (e.g., one or more of its components), a destination identifier identifying Client1 (e.g., one or more one of its components), and the session identifier for communications between Client1 and Host1 In some embodiments, Host1 can determine the session identifier for the carrier packet by performing a lookup of the destination identifier of the carrier packet.

As mentioned previously, in certain instances, the source/destination identifiers of the inter-MCN packet can be different from the source/destination identifier of the carrier packet, even though they are directed to the same MCN communication system. For example, the source/destination identifiers of the inter-MCN packet can be directed to the control and data component 152 or one of its subcomponents (e.g., SGW, PGW, etc.) of the MCN communication systems and the source/destination identifier of the carrier packet can be directed to the backhaul routing component 156 of the MCN communication systems.

Host1 (8) communicates the carrier packet to Client1, and at (9) Client1 processes the carrier packet. As mentioned previously, Host1 can communicate the carrier packet to Client1 in a manner that is similar to the manner in which Host1 communicates a packet to UE4. For example, Host1 can use the session identifier that is used for communications between Host1 and Client1 to communicate the carrier packet to Client1.

As described in greater detail above with (4), Client1 can determine the carrier packet includes an embedded packet, and unencapsulate and process the embedded packet (the inter-MCN packet). In processing the inter-MCN packet, Client1 can determine that Client1 is the requested MCN for the inter-MCN packet and that the inter-MCN packet. Based at least in part on the determination, Client1 can unencapsulate and process the user packet from the inter-MCN packet.

As part of the processing of the user packet, Client1 can determine that while neither the source identifier nor destination identifier match any devices that are registered with Client1, UE1 is accessible via Client1 (e.g., using the session identifier or other identifiers indicating Client1 is the local MCN for UE1). Based at least in part on the session identifiers, Client1 can (10) transmit the packet to the UE1.

Figure 3B:
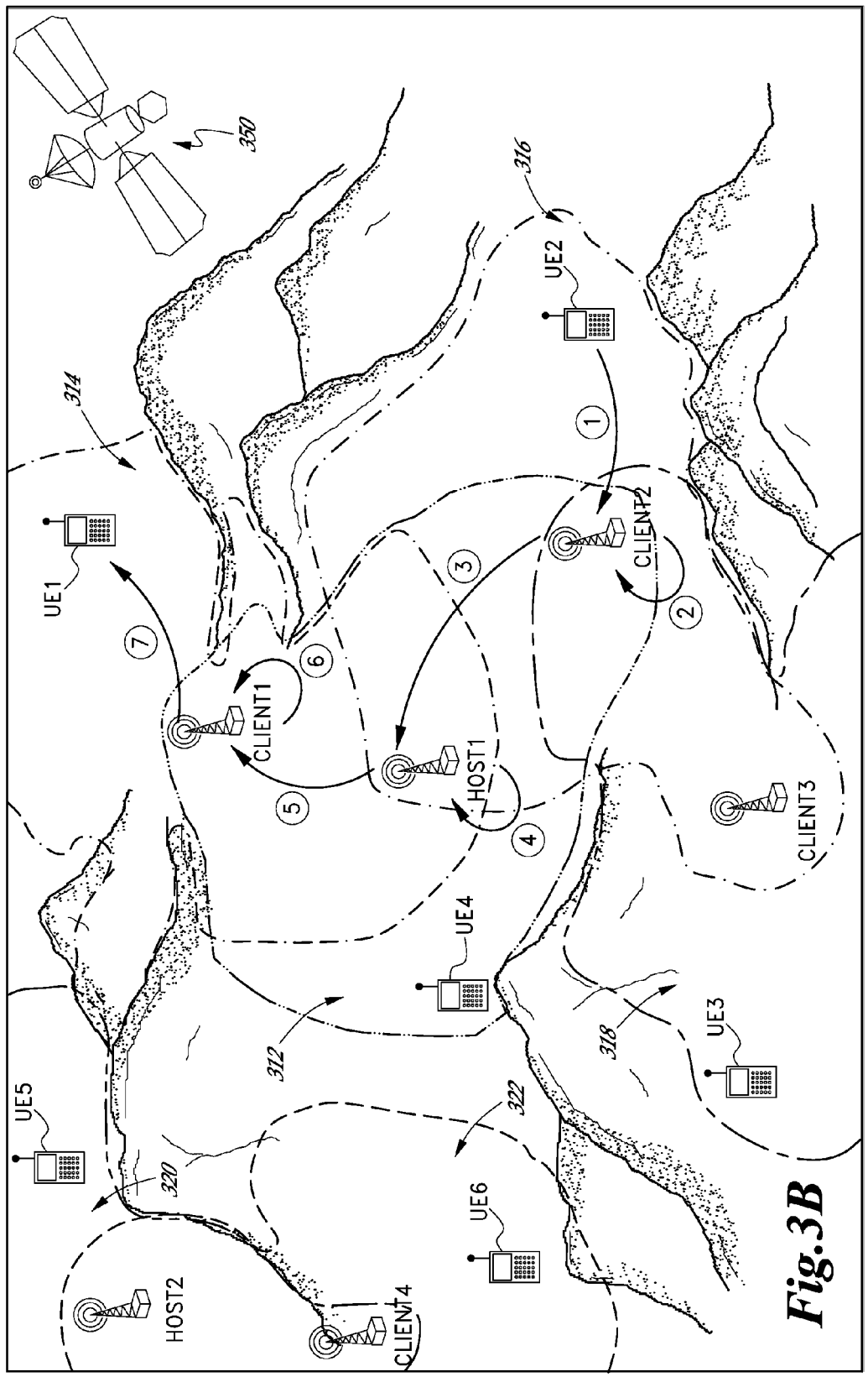

FIG. 3B is a data flow diagram illustrating an embodiment of communications from UE2 (located in the MCN 316 and registered with Client1) to UE1 (located in MCN 314 and registered with Client1). The steps (1)-(4) in the FIG. 3B can be similar in most respects to the steps (1)-(4) described above with reference to FIG. 3A. For example, (1) the user packet from UE2 can be (2) processed by Client2 and embedded within an inter-MCN packet. Based at least in part on the session identifier indicating that Client1 is the registered MCN for UE2, the inter-MCN packet can include a destination identifier for Client1. In addition, the inter-MCN packet can include a source identifier for Client2 and/or a session identifier for communications between UE2 and Client1 (including the direct communication between Client2 and UE2). As described previously, based at least in part on a determination by Client2 that it is not the requested MCN (e.g., is not the registered MCN in this instance), Client2 can embed the inter-MCN packet in a carrier packet for (3) Host1 The source identifier of the carrier packet can identify Client2 (e.g., backhaul routing component 156 of Client2), the destination identifier of the carrier packet can identifier Host1 (e.g., backhaul routing component 156 of Host1), and the session identifier can be the session identifier for communications between Client2 and Host1.

In addition, as mentioned previously, Host1 can treat the carrier packet from Client2 similar to the way in which Host1 treats user packets from UE4 (e.g., Host1 can treat Client2 as a UE). In some embodiments, as part of the (4) processing, Host1 can unencapsulate and process the inter-MCN packet from the carrier packet. As mentioned previously, the inter-MCN packet can include a source identifier (Client2), a destination identifier (Client1), and/or a session identifier (communications between UE2 and Client1).

In addition, as part of the (4) processing, Host1 can determine that it is not the requested MCN (e.g., is not the registered MCN in this instance). In some embodiments, Host1 can determine that it is not the requested MCN based at least in part on a comparison of the destination identifier of the inter-MCN packet (e.g., control and data component of Client1, PGW of Client1, etc.) with an identifier of Host1 (e.g., control and data component 152 of Host1 PGW of Host1 etc.). Based at least in part on the determination that Host1 is not the requested MCN, Host1 can encapsulate the inter-MCN packet in a new carrier packet. The new carrier packet can include a source identifier (Host1), a destination identifier (Client1), and a session identifier (communications between Host1 and Client1). Host1 can (5) communicate the new carrier packet to Client1. As mentioned previously, Host1 can identify or treat Client1 as a UE. For example, to determine the session identifier for the carrier packet, Host1 can perform a lookup based at least in part on the destination identifier. Using the session identifier, Host1 can communicate that new carrier packet to Client1.

Client1 can (6) process the carrier packet. As described previously, as part of the processing, Client1 can determine there is an embedded packet within the carrier packet and unencapsulate the embedded packet (the inter-MCN packet). Client1 can process the inter-MCN packet (e.g., determine that it is the requested MCN) and determine that there is an embedded packet within the inter-MCN packet (the user packet). Client1 can unencapsulate and process the user packet. As part of processing the user packet, Client1 can determine that it is the requested MCN based at least in part on the session identifier for communications between UE2 and Client1. In addition, as described previously, Client1 can determine that it is the local MCN for UE1 based at least in part on the session identifier for communications with UE1 and (7) transmit the user packet to UE1 based at least in part on the session identifier for communications between Client1 and UE1.

In some embodiments, such as when UE1 and UE2 are both registered with Client2, the user packet from UE2 to Client2 can include a source identifier identifying UE2, a destination identifier identifying UE1, and a session identifier for communications between UE2 and Client2.

As part of the processing (2), Client2 can determine that it is the requested MCN based at least in part on the session identifier for communications between Client2 and UE2. Client2 can also determine that while it is the registered MCN for UE1, it is not the requested MCN for UE1 (e.g., the local MCN in this instance). As part of this determination, Client2 can determine that Client1 is the requested MCN (e.g., the local MCN). Accordingly, Client2 can encapsulate the user packet into an inter-MCN packet that includes a source identifier (Client2), a destination identifier (Client1), and/or a session identifier (communications between Client2 and UE1). In addition, Client1 based at least on the determination that it is not the requested MCN can encapsulate the inter-MCN packet into a carrier packet with a source identifier (Client2), destination identifier (Host1), and session identifier (communications between Client2 and Host1).

As described in greater detail above, as part of the (4) processing, Host1 can determine it is the requested MCN for the carrier packet (e.g., based at least in part on the source identifier of the carrier packet; the destination identifier of the carrier packet and/or the session identifier of the carrier packet); unencapsulate the inter-MCN packet; determine that it is not the requested MCN and/or that Client1 is the requested MCN based at least in part on the destination identifier of the inter-MCN packet and/or the session identifier of the inter-MCN packet; encapsulate the inter-MCN packet into a new carrier packet with a session identifier (communications between Client1 and Host1), destination identifier (Client1), and source identifier (Host1); and (5) communicate the carrier packet to Client1.

As part of the (6) processing, Client1 can determine it is the requested MCN for the carrier packet (e.g., based at least in part on the source, destination and/or session identifier of the carrier packet), unencapsulate the inter-MCN packet from the carrier packet, determine that it is the requested MCN for the inter-MCN packet (e.g., based at least in part on the destination identifier and/or session identifier of the inter-MCN packet), unencapsulate the user packet from the inter-MCN packet, determine that it is the requested MCN for the user packet (e.g., based at least in part on the session identifier of the user packet), and determine that even though UE1 is not registered with it, UE1 is located within its MCN 314. In some embodiments, Client1 determines that UE1 is located within its MCN based at least in part on the session identifier for communications between Client2 and UE1, which can include data indicating that Client1 is the local MCN for UE1. In certain embodiments, Client1 processes the user packet from UE2 without using and/or reviewing the source or destination identifier of the user packet.

At (7), Client1 can transmit the user packet from to UE1. In some embodiments, Client1 can transmit the packet to UE1 based at least in part on the session identifier for communications between Client2 and UE1. In certain embodiments, Client1 communicate the packet to UE1 without using and/or reviewing the source destination identifier of the user packet.

Figure 3C:
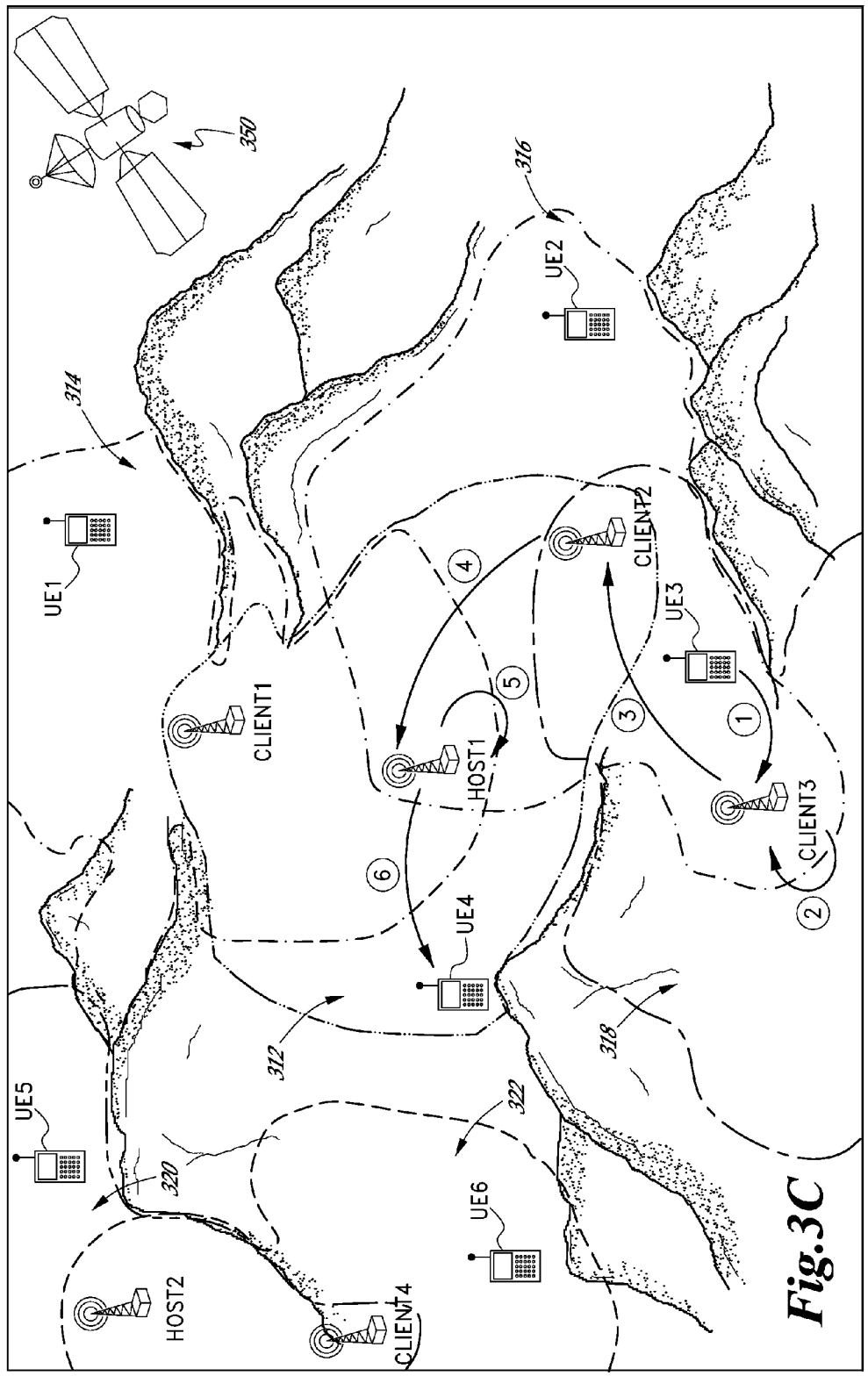

FIG. 3C is a data flow diagram illustrating an embodiment of communications between UE3 (located in the MCN 318 and registered with Host1) and UE4 (located in the MCN 312 and registered with Host1). Similar to the description above, at (1) the UE3 can transmit a packet with a session identifier (communications between Host1 and UE3), a source identifier (UE3), and a destination identifier (UE4), and Client1 can (2) determine that it is not the requested MCN (Host1 in this example). Accordingly, Client1 can encapsulate the packet from UE3 into an inter-MCN packet that includes a source identifier (Client3), destination identifier (Host1) and a session identifier (communications between UE3 and Host1) and encapsulate the inter-MCN packet into a carrier packet that includes a session identifier (communications between Client3 and Host1), a source identifier (Client3), and a destination identifier (Host1). In addition, Client3 can determine that Host1 is accessible via Client2, and (3) transmit the carrier packet to Client2.

Client2 can determine that the carrier packet is for Host1 and (4) transmit the carrier packet to Host1 In some embodiments, Client2 can transmit the carrier packet to Host1 by determining that the packet is a carrier packet and/or that the source and/or destination identifier is another MCN communication system with which it is related, etc. Accordingly, in some embodiments Client2 can be a relay MCN communication system between Host1 and Client3. Furthermore, although not illustrated in FIG. 3C, Client2 can similarly forward/transmit carrier packets from Host1 to Client3.

In certain embodiments, upon receiving the carrier packet that is directed to Host1 Client2 can determine that Client2 is not the requested MCN and embed the carrier packet in a second carrier packet. The second carrier packet can include a source identifier (Client2), a destination identifier (Host1), and a session identifier (communications between Host1 and Client2). Accordingly, in some embodiments, each relay MCN communication system can embed the received packet in an additional carrier packet.

Host1 can (5) process the carrier, inter-MCN, and user packet and (6) transmit the user packet to the UE4, as described in greater detail above with reference to steps (4) and (5) of FIG. 3A. In embodiments where Client2 embeds the carrier packet in an additional carrier packet, Host1 can unencapsulate the one or more carrier packets before unencapsulating the inter-MCN and user packets.

In some cases, when Client3(2) processes the packet from UE3, it can encapsulate the inter-MCN packet in a carrier packet with a destination identifier identifying Client2, and a session identifier identifying communications between Client3 and Client2. In such embodiments, Client2 can process the carrier packet and the inter-MCN packet in a manner similar to the example provided above with reference to Host1 in step (4) of FIG. 3B. For example, Client2 can unencapsulate the inter-MCN packet, determine that it is not the requested MCN for the inter-MCN packet, encapsulate the inter-MCN packet in a new carrier packet with a source identifier (Client2), a destination identifier (Host1) and a session identifier (communications between Client2 and Host1), and communicate the new carrier packet to Host1.

In some cases, Client2 can act as a host for Client3 and one or more additional client MCN communication systems, such that Client2 can identify the requested MCN of an inter-MCN packet from one of its clients and transmit a carrier packet to the requested MCN. In such embodiments, if Client2 does not or cannot identify the requested MCN of the inter-MCN packet (e.g., the requested MCN is not one of the clients of Client2 and is not Host1), Client2 can encapsulate and transmit the packet to Host1 for further processing. Accordingly, Client2 can, in some instances, act as a client or UE to Host1 and act as the host to Client3 (e.g., Client3 can be registered as a UE to Client2).

In some embodiments, Client2 can include identification information for Client3 and Host1 such that it can relay information between the two MCN communication systems. In certain embodiments, Client2 does not include identification information for all of the MCN communication systems related to Host1 In such embodiments, Client2 can be configured to relay communications between Client3 and Host1 and/or other client MCN communication systems that are related to Host1 and that can communicate directly with Client2 (or via another relay MCN communication system), but that cannot communicate directly with Host1.

Figure 3D:
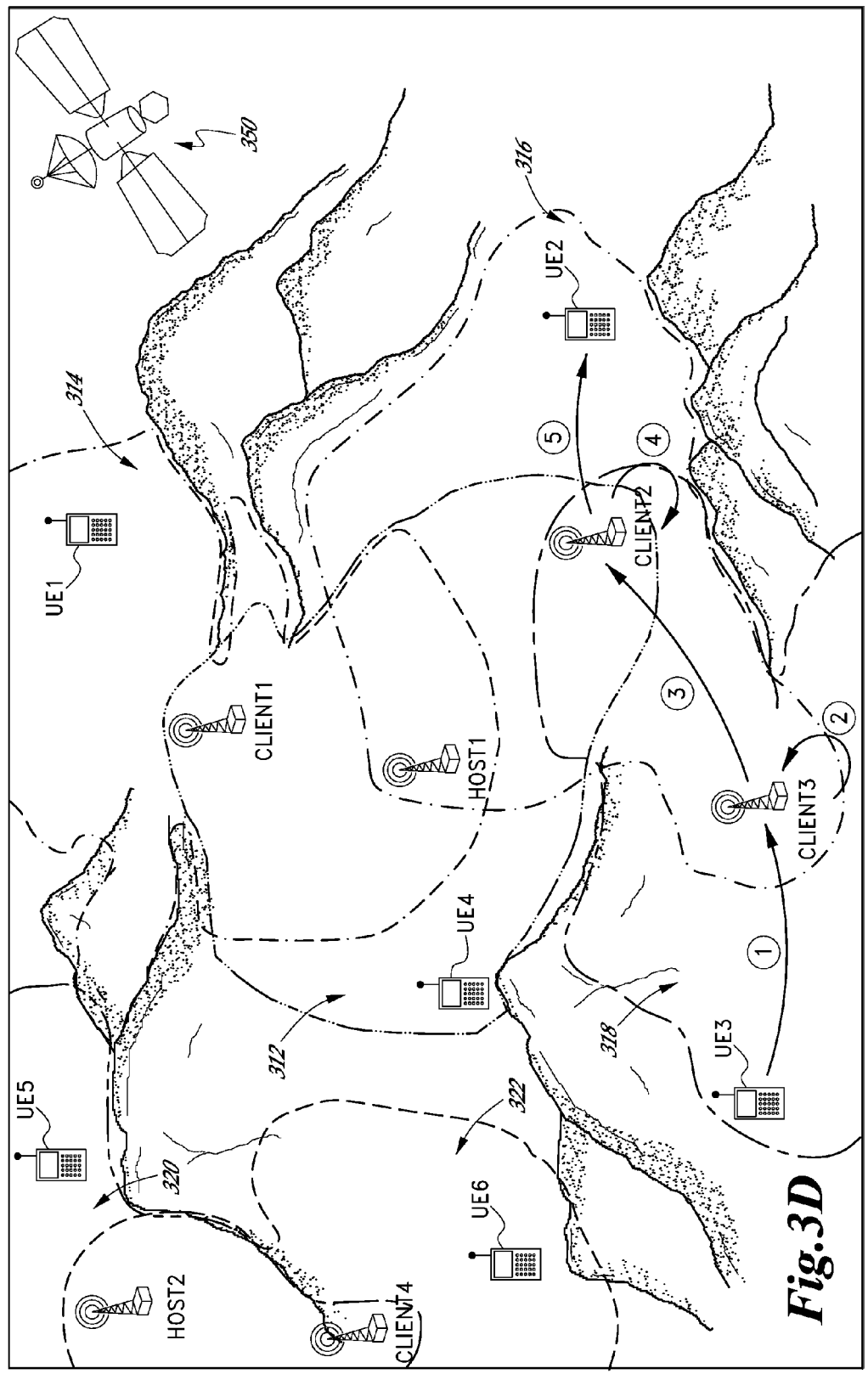

FIG. 3D is a data flow diagram illustrating an embodiment of communications between UE3 (located in MCN 318 and registered with Client2) and UE2 (located in the MCN 316 and registered with Client2). In the illustrated embodiment, Client2 can act as a host to Client3. As such the steps (1)-(5) in the illustrated embodiment can be performed in a manner similar to the steps (1)-(5) described above with reference to FIG. 3A. For example, the user packet from UE3 can include a source identifier (UE3), a destination identifier (UE1) and a session identifier (communications between Client2 and UE3). After processing, Client3 can (3) transmit a carrier packet that includes an inter-MCN packet and the user packet from UE4 to Client2. The carrier packet can include a source identifier (Client3), a destination identifier (Client2), and a session identifier (communications between Client3 and Client2). The Client2 can (7) process the carrier packet, inter-MCN packet, and the embedded packet and (8) transmit/forward the user packet to the UE2.

In some cases, such as when the carrier packet is addressed to Host1 Client2 can forward the carrier packet to Host1. Host1 can process the carrier packet and the inter-MCN packet to determine that the requested MCN for the inter-MCN packet is Client2. Host1 can embed the inter-MCN packet in a new carrier packet and transmit the new carrier packet to Client2. Client2 can then process the carrier packet, the inter-MCN packet, and the user packet, and transmit/forward the user packet to UE2.

Figure 3E:
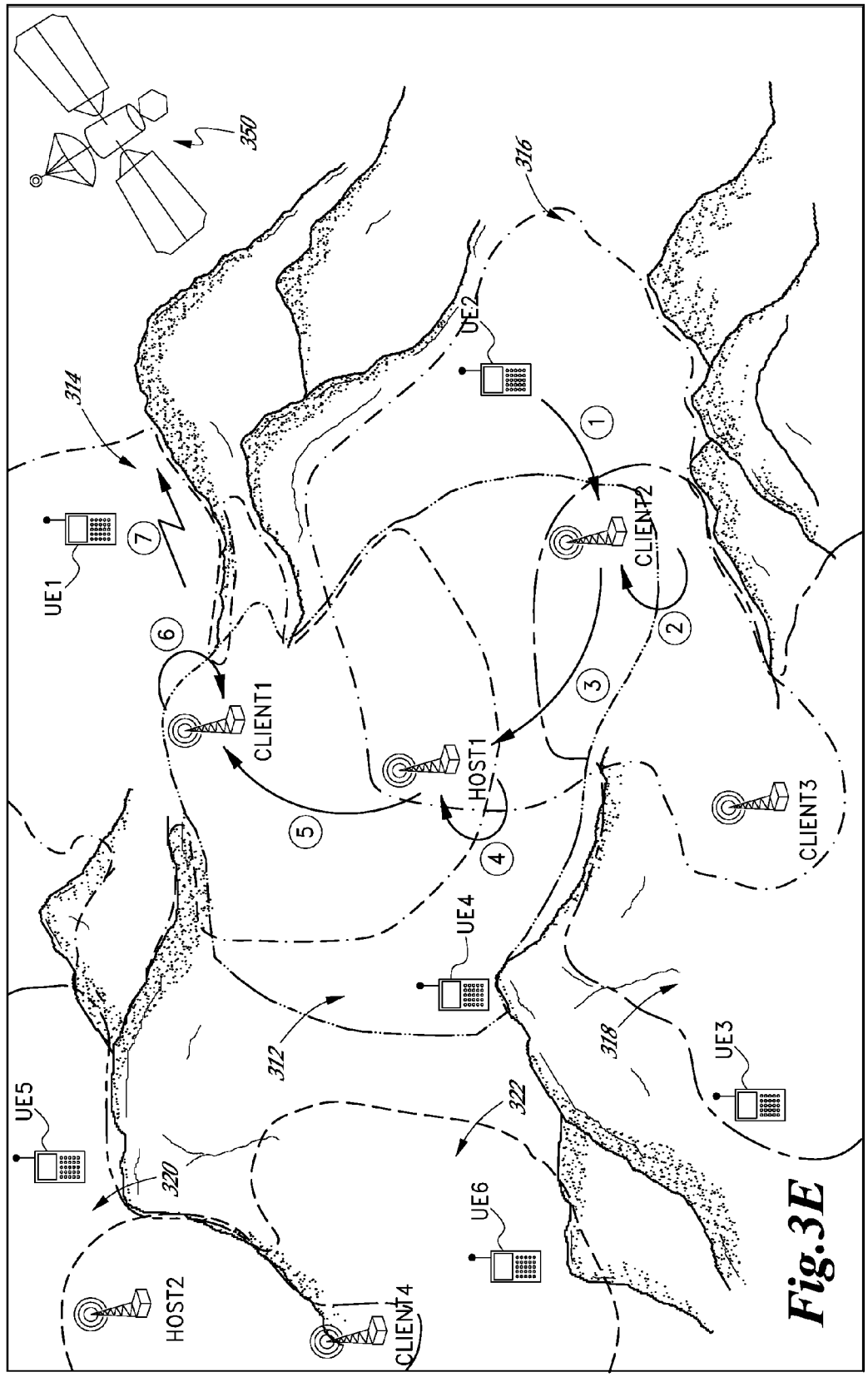

FIG. 3E is a data flow diagram illustrating an embodiment of communications between UE2 (located in the MCN 316 and registered with Client1) and an application/server that is accessible via Client1. For example, the server can be communicatively coupled to Client1 locally via wired or wireless communication (e.g., co-located with, in the same room, area, building, etc.) and/or via a traditional backhaul link (e.g., via satellite 350). In the illustrated embodiment, steps (1)-(6) can be similar to steps (1)-(6) described above with reference to FIG. 3B. For example, (1) the packet from the UE2 can include a source identifier (UE2), a destination identifier (application/server), and a session identifier (communications between Client1 and UE2). Based on (2) the processing of the packet from UE2, Client2 can (3) communicate a carrier packet to Host1, Host1 can (4) process the carrier and/or inter-MCN packet, and (5) communicate a new carrier packet with the inter-MCN and/or user packet to Client1. Client1 can (6) process the carrier packet from Host1 and/or the inter-MCN. As part of the processing, Client1 can determine that it is the requested MCN for the carrier and/or inter-MCN packet. In addition, as part of processing the user packet, Client1 can determine that it has access to the server. For example, Client1 can perform a lookup based at least in part on the destination identifier or server's identifier. If Client1 determines that the server is accessible (either locally or via the satellite backhaul 350), Client1 can (7) communicate the user packet to the server and/or the satellite 350 for further routing.

In some embodiments, such as when Client2 s the registered MCN of UE2, as part of the (2) processing, Client2 can encapsulate the user packet from the UE2 into a carrier packet without an inter-MCN packet. As mentioned previously, in some embodiments, inter-MCN packets can be omitted for communications directed to devices other than user equipment, such as servers, etc. Accordingly, at (3), Client2 can communicate the carrier packet to Host1, Host1 can (4) process the carrier packet, and (5) communicate a new carrier packet with the user packet to Client1. Client1 can (6) unencapsulate the user packet from the carrier packet and process the user packet. As mentioned previously, as part of the processing, Client1 can perform a lookup and (7) communicate the user packet to a local server (or other device) and/or to the satellite 350.

Similarly, in certain cases, such as when Host1 is the registered MCN of UE2, Client2 can (3) communicate a carrier packet that includes an inter-MCN packet to the Host1 The inter-MCN packet can include a source identifier (Client2) and a destination identifier (Host1). As part of the (4) processing, Host1 can unencapsulate the user packet from the carrier and inter-MCN packets and determine that to access the server, the packet is to be routed through Client1. Accordingly, Host1 can encapsulate the user packet into a carrier packet and (5) transmit the carrier packet to Client1. In some cases, the carrier packet transmitted from Host1 to Client1 can omit the inter-MCN packet.

Packets received from the server and/or satellite 350 at Client1 can be routed back to the UE2. For example, Client1 can receive a user packet from the server and/or the satellite 350. The user packet can include a source identifier (the server or other source), and a destination identifier UE2. In some embodiments, because server is not a UE and/or does not communicate with Client1 in a manner similar to a UE, the packet does not include a session identifier. However, in certain embodiments, the packet can include a session identifier. Client1 can perform a lookup based at least in part on the destination identifier (UE2) of the user packet and determine that it is the registered MCN for UE2 and that Client2 is the local MCN for UE2. In some embodiments, this information can be included as part of a session identifier for communications between Client1 and UE2.

Based at least in part on the session identifier, the user packet can be routed to Client2 using an inter-MCN packet and one or more carrier packets (e.g., a carrier packet from Client1 to Host1 and a carrier packet from Host1 to Client2), similar to the examples described above. Client2 can process the carrier packet from Host1 the inter-MCN packet from Client1 and the user packet from the server, and communicate the user packet to the UE2 based at least in part on the session identifier for communications between Client1 and the UE2.

In some embodiments, such as when all communications external to the related MCN communication systems are handled by Host1 Client1 can, after processing the user packet from UE2, encapsulate it in an inter-MCN packet and a carrier packet for Host1 Host1 can unencapsulate the user and/or inter-MCN packet and route it through the satellite 350, on behalf of Client1.

In such embodiments, for packets that come from the satellite 350 that are destined for the UE2, Host1 can encapsulate and send the user and/or inter-MCN packet in an inter-MCN and/or a carrier packet to Client1. After processing the user packet, Client1 can encapsulate the user and/or inter-MCN packet in a new inter-MCN and carrier packet and send the carrier packet to Host1. Host1 after processing the carrier and inter-MCN packets can transmit a new carrier packet with the inter-MCN packet to Client2 in a new carrier packet. Finally, Client2 can process the carrier packet from Host1 the inter-MCN packet from Client1 and the user packet from the server and/or satellite 350, and forward the user packet to UE2 based at least in part on a session identifier for communications between Client1 and the UE2, as described in greater detail above. In certain embodiments, rather than routing the packet back-and-forth between Host1 and Client1, Host1 can determine that the UE2 is located in the MCN of Client2 and process the packet accordingly without communicating with Client1.

Figure 3F:
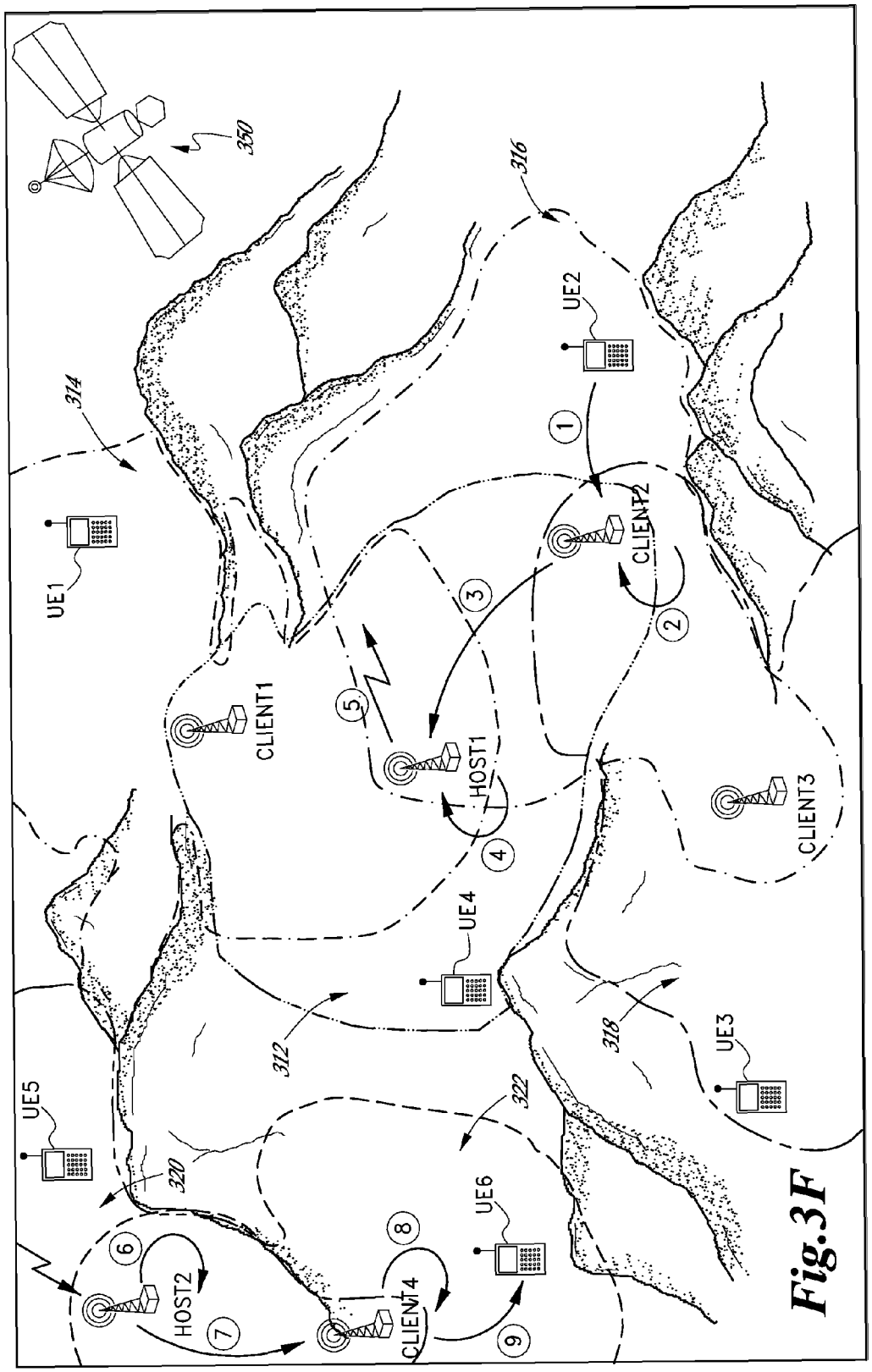

FIG. 3F is a data flow diagram illustrating an embodiment of communications between UE2 (located in the MCN 316 and registered with Client4) and UE6 (located in the MCN 322 and registered with Client4). Steps (1)-(4) of the illustrated embodiment can be similar to the steps (1)-(4) of FIG. 3B, described previously.

For example, (1) the user packet from the UE2 can include a source identifier (UE2), a destination identifier (UE6), and a session identifier (communications between Client4 and UE2). Based on the (2) processing of the user packet from UE2, Client2 can (3) transmit the user packet embedded within an inter-MCN packet that is embedded within a carrier packet to Host1, and Host1 can (4) process the carrier and inter-MCN packets. As part of the processing, Host1 can determine that it is neither the requested MCN for the inter-MCN packet nor related to Client4, but is associated with Client4 as part of a network of MCN communication systems, described in greater detail in U.S. application Ser. No. 13/972,112, previously incorporated herein by reference. Accordingly, Host1 can use routing information regarding Client4 to communicate the inter-MCN packet to Host2 via the satellite 350 (or other typical backhaul).

Host2 can (6) process the inter-MCN packet and determine that the requested MCN (the registered MCN in this instance) is Client4. Based at least in part on the determination, Host2 can encapsulate the inter-MCN packet in a new carrier packet and (7) transmit the carrier packet to Client4. Client4 can (8) process the carrier, inter-MCN, and user packet and (9) communicate the user packet to the UE6.

As described in greater detail above, packets can be communicated from UE6 (located in the MCN 322 and registered with Client4) to UE2 (located in the MCN 316 and registered with Client4), as well. For example, user packets from the UE6 to Client4 can include a source identifier (UE6), a destination identifier (UE2), and a session identifier (communications between Client4 and UE2). As part of the registration process between UE2 and Client4, Client4 and/or Host2 can retain information regarding how to access the UE2 (e.g., that UE2 is located in the MCN of Client2 and/or that UE2 can be accessed via Host1 and/or Host1 etc.). The Client4 and/or Host2 can use the information regarding how to access the UE2, such as the session identifiers to encapsulate user packets from UE6 into inter-MCN and carrier packets, and communicate the inter-MCN and/or user packets to Host1 via the satellite 350.

Furthermore, it will be understood that configurations other than those described above can be used as desired. For example, UE1 (located in MCN 314) and UE4 (located in MCN 312) can each be registered with Client2. In such an embodiment, communications between UE1 and UE4 can be processed by Client2. As another example, UE1 (located in MCN 314) and UE4 (located in MCN 312) can each be registered with Client4. In such an embodiment, communications between UE1 and UE4 can be routed through and/or processed by Client4.

Moving MCN Communication Systems

Similar to the movement of MCN communication systems, as described in greater detail in U.S. application Ser. No. 13/972,112, previously incorporated herein by reference, Host1, Host2 and Clients1-4 can move and Host1 and Host2 can track the movement of their respective clients, update which MCN communication systems are related and can be communicated with, which MCN communication systems can be communicated with directly or indirectly via relay MCN communication systems, provide relevant information to affected UEs, etc. Furthermore, in some embodiments, if a MCN communication system is no longer accessible directly or indirectly via MCN communication systems, Host1, Host2 can maintain communication with it via a typical backhaul (e.g., satellite 350). In certain embodiments, if moving MCN communication systems and/or UEs changes the local MCN of a UE, a corresponding session identifier in the registered MCN, the old local MCN, and/or the new local MCN can be changed, created, deleted, etc.

Master Device Change in a NOM

Similar to the change of a Master Device in a network of MCN communication systems, as described in greater detail in U.S. application Ser. No. 13/972,112, previously incorporated herein by reference, the host for related MCN communication systems can be changed as well.

Packet Encapsulation

Figure 4:
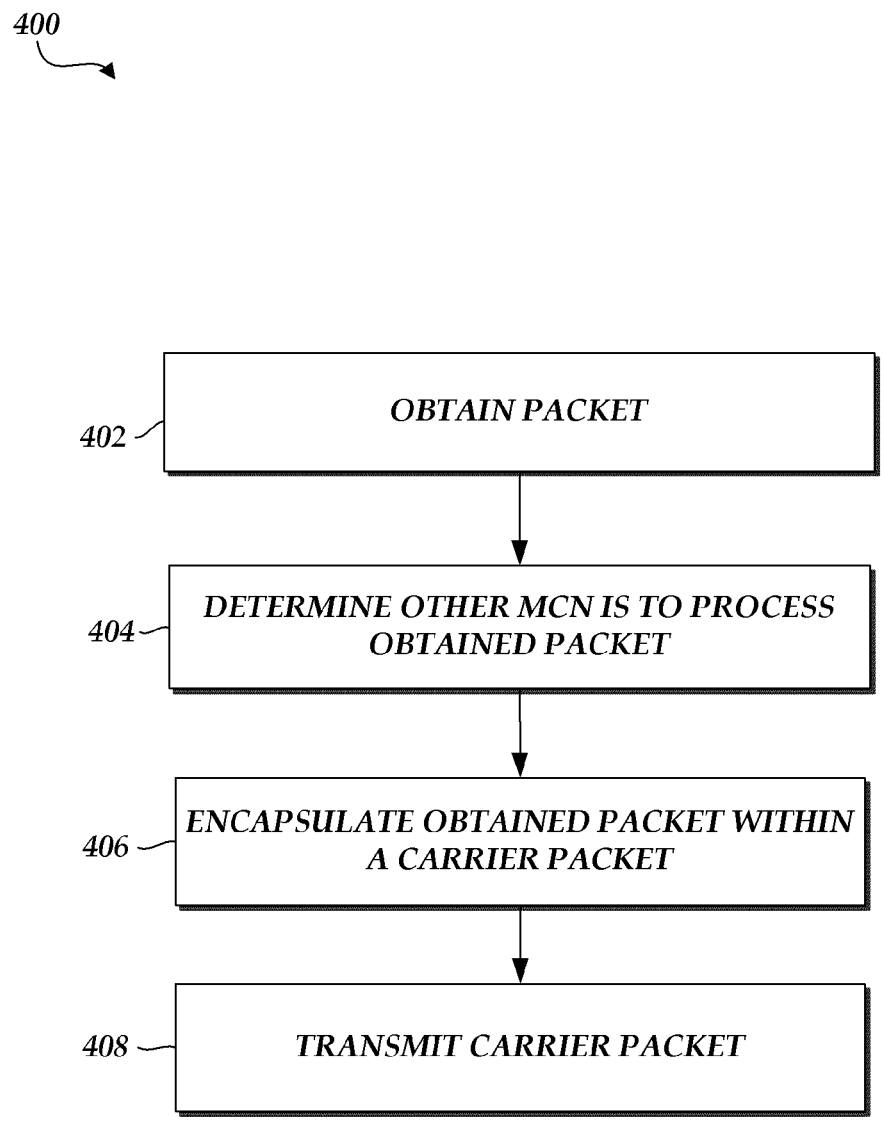
FIG. 4 is a flow diagram illustrative of an embodiment of a routine implemented by a MCN communication system for encapsulating a packet.

FIG. 4 is a flow diagram illustrative of an embodiment of a routine 400 implemented by a MCN communication system (generally referred to herein as the "receiving MCN") for encapsulating a packet. The receiving MCN can be a host MCN communication system, a client MCN communication system, and/or a relay MCN communication system. One skilled in the relevant art will appreciate that the elements outlined for routine 400 may be implemented by one or many computing devices/components that are associated with the receiving MCN, such as the control and data component 152 and/or the user/client component 156. Accordingly, routine 400 has been logically associated as being generally performed by the receiving MCN, and thus the following illustrative embodiments should not be construed as limiting. In addition, although reference below is made to packets being transmitted to/from UEs, it will be understood that reference to the UEs is for simplicity and that the routine 400 can be equally used to encapsulate packets to/from other destinations, such as applications, servers, components of the MCN communication systems, etc.

At block 402, the receiving MCN obtains a packet of data. The receiving MCN can obtain the packet in a variety of ways. For example, in some embodiments, the receiving MCN can receive a user packet from a UE, server, or other device located within the MCN of the receiving MCN and/or from a server or other device that can communicate with the receiving MCN via a typical backhaul (e.g., wired, satellite, or microwave communication). In certain embodiments, the receiving MCN can receive or obtain an inter-MCN packet from another MCN communication system, from the Internet (or other network), and/or from a mobile core network component (either its own, from a related MCN communication system and/or via a typical backhaul). In certain cases, the receiving MCN can obtain a user and/or an inter-MCN packet after unencapsulating the user and/or inter-MCN packet from a carrier packet, as described in greater detail below in FIG. 5.

In some embodiments, the receiving MCN can receive numerous user packets from a UE or other device (e.g., a server, etc.) that is located within its covered area or from a device that is remotely located and communicates via a typical backhaul. Generally, the types of user packets received from the UE or other device can be in the form of user plane traffic or control plane or signaling traffic. In some embodiments, the user plane traffic can include a source/destination identifier, a session identifier, as well as data for the destination (e.g., voice data, video data, application data, etc.). In some embodiments, the user packet does not include a session identifier, such as when the source of the packet is a server.

While in some cases, the control plane/signaling traffic can include the source/destination identifiers and network identifier, similar to user plane traffic, in some instances, the control plane or signaling traffic from a UE does not include a source/destination identifier. For example, a UE may not be registered with the receiving MCN, have an identifier assigned from the receiving MCN at the time, and/or may not know the IP address of the destination (e.g., the requested MCN). In this context, the UE and receiving MCN (the MCN communication system with which the UE is communicating in this instance) can identify each other based on session identifiers, etc. Although the packet may not include a source/destination identifier, it can still include the session identifier. Similarly, when a client MCN communication is registering with a host MCN communication system, communications between the two can be done based at least in part on session identifiers.

In some instances, packets can be obtained by the receiving MCN after it has processed a carrier packet and/or inter-MCN packet that included an embedded inter-MCN and/or user packet, as described in greater detail below with reference to FIG. 5. Furthermore, packets obtained from the control and data component 152 of the receiving MCN can identify a requested MCN that is different than the receiving MCN.

At block 404, the receiving MCN determines that another MCN communication system is to process the obtained packet and/or the requested MCN is different from the receiving MCN. In some cases, to determine that the requested MCN is a different MCN communication system (e.g., that the packet is to be processed by a different MCN communication system), the receiving MCN can review the session identifier and/or the network identifier of the packet (e.g., user packet, inter-MCN packet and/or carrier packet). When the network identifier of the packet is different from the network identifier of the receiving MCN and/or the session identifier does not indicate the receiving MCN is the registered MCN and/or the local MCN, the receiving MCN can determine that the packet is to be processed by a different MCN communication system (e.g., that the requested MCN is different from the receiving MCN). In some embodiments, the receiving MCN determines that the packet is to be processed by a different MCN communication system (e.g., the receiving MCN is different form the requested MCN) without reviewing the source/destination address of the packet and/or without reviewing whether there is a source/destination address.

It will be understood that the receiving MCN can use a variety of techniques to determine that the packet is to be processed by a different MCN communication system or that the requested MCN is different from the receiving MCN. For example, the packet can include a flag indicating that the receiving MCN is not to process the packet, etc. Furthermore, in certain embodiments, the receiving MCN can review the source/destination identifier to determine that the packet is to be processed by a different MCN communication system. For example, if the destination identifier of a user packet, inter-MCN packet, and/or carrier packet matches an identifier for a MCN communication or one of its components, the receiving MCN can determine that it is the requested MCN. If the destination identifier does not match, the receiving MCN can determine that it is not the requested MCN. In some cases, such as when the receiving MCN receives a carrier packet and the source identifier matches the source identifier of the host MCN communication system of the receiving MCN, the receiving MCN can determine that it is the requested MCN. In certain embodiments, such as when the receiving MCN receives a user packet and the source identifier matches a UE that is registered with the receiving MCN, the receiving MCN can determine it is the requested MCN.

At block 406, the receiving MCN encapsulates the obtained packet. In some cases, the receiving MCN encapsulates the obtained packet within an inter-MCN packet. In certain embodiments, the receiving MCN encapsulates the obtained packet within a carrier packet based at least in part on the determination that the packet is to be processed by a different MCN communication system and/or that that the requested MCN is different from the receiving MCN. Furthermore, in some embodiments, the receiving MCN encapsulates the obtained packet in an inter-MCN packet and a carrier packet. In certain embodiments, the receiving MCN encapsulates the obtained packet within a carrier packet and omits encapsulating the obtained packet within an inter-MCN packet. For example, in some instances, if a packet is destined for a device that is not a user equipment, the receiving MCN can encapsulate an obtained user packet in a carrier packet without encapsulating the user packet within an inter-MCN packet.

In some embodiments, the source identifier of the carrier packet can be the receiving MCN (e.g., the backhaul routing component 156 or other component of the receiving MCN). In certain embodiments, the destination identifier of the carrier packet can be the location of the requested MCN of the inter-MCN packet or user packet, a relay MCN communication system, and/or the local MCN (e.g., the backhaul routing component 156 of the requested MCN of the inter-MCN packet or user packet, the backhaul routing component 156 of the relay MCN communication system, or local MCN, etc.).

As non-limiting examples, if the receiving MCN is a client MCN communication system, the destination identifier can be the IP address of the backhaul routing component 156 of a host or a relay MCN communication system related to the client MCN communication system. If the receiving MCN is a host or relay MCN communication system, the destination identifier can be the IP address of the backhaul routing component 156 of the requested MCN. If the host or relay MCN communication system does not have direct access to the requested MCN, but the requested MCN is related to the host or relay MCN communication system, the destination identifier can be the IP address of the backhaul routing component 156 of a relay MCN communication system (or an additional relay MCN communication system) that is closer to the requested MCN. It will be understood that identifiers other than an IP address can be used and/or that components other than the backhaul routing component 156 of the MCN communication systems can be used.

In some cases, the session identifier of the carrier packet can correspond to the communicative link between the receiving MCN and the MCN communication system to which the carrier packet is being sent directly. For example, if the receiving MCN is transmitting the carrier packet directly to a host or client MCN communication system, the session identifier of the carrier packet can correspond to the session identifier used for communications between the receiving MCN and the host or client MCN communication system. However, if the carrier packet is to pass through any relay MCN communication systems, the session identifier of the carrier packet can correspond to the session identifier used for communications between the receiving MCN and the next relay MCN communication system (e.g., the relay MCN communication system in direct communication with the receiving MCN).

In some instances, the session identifier of the carrier packet can correspond to the session identifier used for communications between the receiving MCN and the MCN communication system that is to process the carrier packet. For example, if the carrier packet is destined for a host MCN communication system from a client MCN communication system (or vice versa), the session identifier of the carrier packet can correspond to the session identifier used for communications between the receiving MCN and the host MCN communication system (or client MCN communication system) whether or not the carrier packet will pass through any relay MCN communication systems. In such instances, in some embodiments, any relay MCN communications systems that are traversed by the carrier packet can embed the carrier packet in an additional carrier packet or forward the carrier packet without embedding it in an additional carrier packet and/or without unencapsulating the embedded packet, as desired. Accordingly, in certain embodiments, a carrier packet can include one or more embedded carrier packets in addition to an embedded inter-MCN and/or user packet.

At block 408, the receiving MCN transmits the carrier packet. In some embodiments, the receiving MCN transmits the carrier packet to another MCN communication system that is in direct communication with the receiving MCN. The MCN communication system to which the carrier packet is transmitted can be a host MCN communication system, a client MCN communication system, and/or a relay MCN communication system. In certain embodiments, the carrier packet is transmitted as user plane traffic, regardless of the contents of the embedded packet. For example, the embedded user packet can include user plane or control plane traffic, but the carrier packet can be transmitted as user plane traffic. In this way, the backhaul communications between various MCN communication systems can be the same as, or similar to, the wireless standard used for communication between UEs in a MCN and the components of the MCN communication system that provides the MCN. In some embodiments, the carrier packets are transmitted/received/processed as packets to/from UEs.

Fewer, more, or different blocks can be used in routine 400 as desired. For example, any one or more blocks from routines 500 and/or 600, described below can be used in conjunction with routine 400.

In addition, in certain embodiments, such as when the receiving MCN is a host MCN communication system, the receiving MCN can identify the requested MCN for an inter-MCN packet, and use the identification to determine where to send the inter-MCN packet. For example, the host MCN communication system can include a table of the various session identifiers that are used for communications between the host MCN communication system and the client or relay MCN communication systems that are related to the host MCN communication system (e.g., have been registered as UEs with the host MCN communication system) or routing tables for MCN communication systems that are associated with the host MCN communication (e.g., other MCN communication systems that are part of the same network of MCN communication systems, as described in greater detail in U.S. application Ser. No. 13/972,112, previously incorporated herein by reference).

The table can include destination identifiers and/or session identifiers for each of the MCN communication systems related to the host MCN communication system (e.g., IP addresses or session IDs for the related MCN communication systems and/or IP addresses for the components/subcomponents of the related MCN communication systems). Additionally, the table can include destination identifiers for the MCN communication systems that can communicate with the requested MCN (e.g., a destination identifier for a standalone MCN communication system and/or another host MCN communication system that has access to the requested MCN). Using the table, the host MCN communication system can determine where the carrier packet that it has generated is to be sent. For example, the host MCN communication system can determine the session identifier or routing for the MCN communication system that corresponds to the destination identifier in the inter-MCN packet, etc.

Conversely, in some embodiments, after encapsulating the inter-MCN packet in a carrier packet, client MCN communication systems always send the carrier packet to a particular host MCN communication system or a particular relay MCN communication system. In certain embodiments, client MCN communication systems do not always send the carrier packet to a particular host MCN communication system or a particular relay MCN communication system.

Furthermore, in some embodiments, prior to encapsulating the obtained packet within the carrier packet, the receiving MCN, such as a host MCN communication system, can determine whether the requested MCN is related to the receiving MCN. In some cases, the receiving MCN can determine whether the requested MCN is related to the receiving MCN based at least in part on a list of identifiers for other MCN communication systems that are registered with the receiving MCN. For example, as described above, each host MCN communication system can include a list of client MCN communication systems and/or relay MCN communication systems that are registered with the host MCN communication system as UEs. The registered MCN communication systems can either be directly accessible via wireless communication, such as 4G LTE wireless communication, or indirectly accessible via one or more relay MCN communication systems. In some embodiments, the list of related MCN communication systems can include all MCN communication systems that are accessible without using a wired, satellite, and/or microwave backhaul.

In certain embodiments, the receiving MCN can determine whether the requested MCN is related to the receiving MCN based at least in part on whether the requested MCN is to be accessed via one or more host, client, or relay MCN communication systems or whether the requested MCN is to be accessed via another backhaul standard or technology. In some embodiments, the receiving MCN can determine whether the requested MCN is to be accessed via one or more host, client or relay MCN communications systems based on a comparison of an identifier of the host, client and relay MCN communication systems that are related to the receiving MCN in a host/client/relay relationship (e.g., other MCN communication systems that are registered with the MCN communication system and/or can be reached directly, or indirectly without using another backhaul standard or technology, such as satellite or microwave, etc.).

As a non-limiting example, if the receiving MCN determines that the requested MCN is related to the receiving MCN, the receiving MCN can proceed to encapsulate the inter-MCN and/or user packet in a carrier packet, and transmit the carrier packet. If the receiving MCN determines that the requested MCN is not related to the receiving MCN, the receiving MCN can transmit the obtained packet using a different backhaul standard or technology. For example, the receiving MCN can transmit the obtained packet via satellite, wired, and/or microwave communication to the Internet, or other network for routing, etc. Accordingly, the receiving MCN can transmit the inter-MCN and/or user packet over a typical backhaul to a server, or other device, or to another MCN communication system, which may be the requested MCN or may be a MCN communication system that can access the requested MCN. In such embodiments, the receiving MCN can transmit the user and/or inter-MCN packet without encapsulating it within a carrier packet. Any one or any combination of the above-referenced embodiments can be used as desired.

Processing Encapsulated Packets

Figure 5:
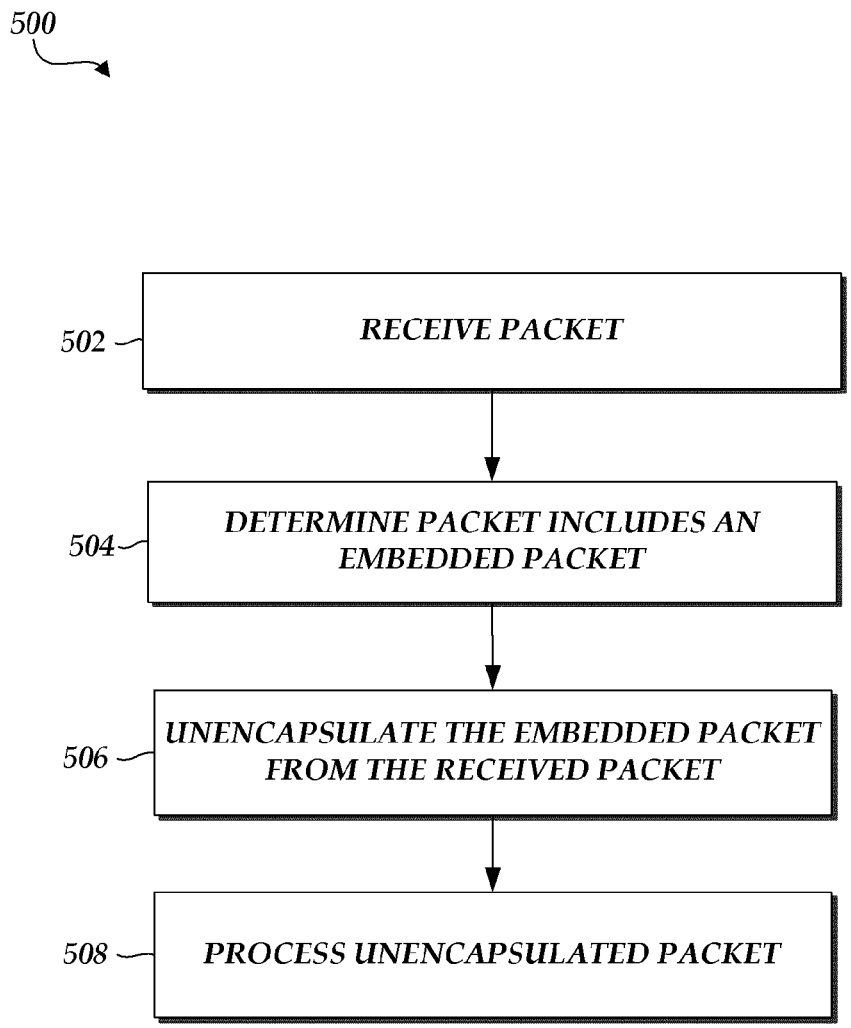
FIG. 5 is a flow diagram illustrative of an embodiment of a routine implemented by a MCN communication system for processing an encapsulated packet.

FIG. 5 is a flow diagram illustrative of an embodiment of a routine 500 implemented by a MCN communication system (generally referred to herein as the "receiving MCN") for processing an encapsulated packet. The receiving MCN can be a host MCN communication system, a client MCN communication system, and/or a relay MCN communication system. One skilled in the relevant art will appreciate that the elements outlined for routine 500 may be implemented by one or many computing devices/components that are associated with the receiving MCN, such as the control and data component 152, the backhaul routing component 156, etc. Accordingly, routine 500 has been logically associated as being generally performed by the receiving MCN, and thus the following illustrative embodiments should not be construed as limiting. In addition, although reference below is made to packets being transmitted to/from UEs, it will be understood that reference to the UEs is for simplicity and that the routine 500 can be equally used to encapsulate packets to/from other destinations, such as applications, servers, components of the MCN communication systems, etc.

At block 502, the receiving MCN receives a packet of data. As described in greater detail above, the receiving MCN can receive or obtain packets from a variety of locations and components. In some embodiments, the receiving MCN receives an inter-MCN and/or carrier packet from a client MCN communication system, a host MCN communication system, and/or a relay MCN communication system. As a non-limiting example, the receiving MCN can receive an inter-MCN and/or carrier packet from the backhaul routing component 156 of another MCN communication system.

At block 504, the receiving MCN determines that the received packet includes an embedded packet, such as an inter-MCN and/or user packet (e.g., the receiving MCN determines that the received packet is a carrier packet). In some embodiments, the receiving MCN determines that the received packet includes an embedded packet based at least in part on a review of the source, destination, and/or session identifiers of the received packet. As a non-limiting example, if the source of the received packet is a backhaul routing component 156 of another MCN communication system and the destination is the backhaul routing component 156 of the receiving MCN, the receiving MCN can determine that the received packet is a carrier packet and/or includes an embedded packet. In some embodiments, the receiving MCN compares the source identifier with IP addresses, or other identifiers of backhaul routing components 156 of other MCN communication systems related to the receiving MCN. If there is a match, the receiving MCN can determine that the packet is a carrier packet and includes an inter-MCN and/or user packet. In some instances, if the destination identifier matches an identifier of the backhaul routing component 156 of the receiving MCN, the receiving MCN can determine that the received packet is a carrier packet. Additionally, in some embodiments, if the session identifier indicates communications are between two MCN communication systems, the receiving MCN can determine that the received packet includes an embedded packet.

It will be understood that the receiving MCN can determine that the received packet is a carrier packet and/or includes an embedded packet in a variety of ways. For example, other components can be used rather than, or in addition to, the backhaul routing component 156, and a comparison can be made based at least in part on the identification of the component(s) used. In some embodiments, the packet can include a flag or other indicator indicating that it includes an embedded packet and/or is a carrier packet. The indicator can be implemented as a particular bit or multiple bits/bytes in the packet, as a special IP address, source identifier, destination identifier, etc.

At block 506, the receiving MCN unencapsulates the embedded inter-MCN and/or user packet from the received (carrier) packet. As part of the unencapsulation, the receiving MCN can discard the carrier packet while maintaining the content of the embedded packet.

At block 508, the receiving MCN processes the unencapsulated packet. In some embodiments, to process the unencapsulated packet, the receiving MCN performs at least some of the routine 400, described above with reference to FIG. 4. For example, in some embodiments, such as when the receiving MCN is a host or relay MCN communication system, the receiving MCN can determine that the requested MCN is different from the receiving MCN, encapsulate the inter-MCN and/or user packet within a new carrier packet based at least in part on the determination that the inter-MCN and/or user packet is to be processed by a different MCN communication system or that that the requested MCN is different from the receiving MCN, and/or transmit the new carrier packet. In some instances, such as when the receiving MCN is a host MCN communication system, the receiving MCN can also determine that the requested MCN is related to the receiving MCN prior to encapsulating the unencapsulated packet.

In certain embodiments, such as when the receiving MCN is a host MCN communication system, if the receiving MCN determines that the requested MCN is not related to the receiving MCN, processing at block 508 can include forwarding the inter-MCN and/or user packet towards the requested MCN via a typical backhaul link, such as wired, satellite, and/or microwave communications.

In some embodiments, such as when the receiving MCN determines that it is the requested MCN, the processing at block 508 can include unencapsulating a user packet from an inter-MCN packet and/or forwarding the user packet based at least in part on the destination identifier. As non-limiting examples, if the destination identifier identifies a UE located within the covered area provided by the receiving MCN, the receiving MCN can communicate the user packet to the UE based at least in part on a session identifier for the UE. If the destination identifier identifies a component of the receiving MCN, the receiving MCN can forward the unencapsulated packet to the respective component, such as, but not limited to one or more of the radio access component 150, the control and data component 152 (e.g., PGW, SGW, MME, PCRF, etc.), the data store 154 (e.g., HSS), and/or the backhaul routing component 156, etc.

If the destination identifier identifies a server, another MCN communication system, or other device that is accessible via the receiving MCN, the processing at block 508 can include forwarding the unencapsulated packet towards its destination. In some cases, the receiving MCN can use the Internet or other backhaul technologies (e.g., satellite, wired communications, microwave communications, etc.) to transmit an unencapsulated packet or a carrier packet. In some instances, such as when a server is proximately located to the receiving MCN, the receiving MCN can communicate the user packet to the server without using another backhaul technology.

In certain embodiments, such as when the receiving MCN is the requested MCN for a user packet and the destination is registered with the receiving MCN, but the destination is not directly accessible to the receiving MCN, the processing at block 508 can include encapsulating the user packet into an inter-MCN and/or carrier packet and transmitting the inter-MCN and/or carrier packet towards the destination. For example, in some cases, the local MCN is different than the registered MCN. In such embodiments, when the receiving MCN processes the packet, it can transmit the user packet in an inter-MCN and/or a carrier packet towards the local MCN.

In some embodiments, the receiving MCN can determine where the UE is located based at least in part on session identifiers that are established when the UE registers with the registered MCN. Based on the determined location of the UE, the receiving MCN can transmit the inter-MCN packet and/or carrier packet to or towards the local MCN. For example, if the local MCN is related to the receiving MCN, the receiving MCN can transmit a carrier packet including the packet to or towards the local MCN. If the local MCN is not related to the receiving MCN (but is associated with the receiving MCN), the receiving MCN can transmit an inter-MCN packet to or towards the local MCN.

In some embodiments, such as when the receiving MCN is the local and/or requested MCN, but is not the registered MCN, the processing at block 508 can include communicating with the destination using one or more session identifiers. For example, when the receiving MCN is the local MCN for a UE, but is not the registered MCN for the UE, the communications between the UE and the receiving MCN can be based at least in part on a session identifier. Accordingly, when the receiving MCN receives a packet for the UE, it can use the session identifier to relay the packet to the UE. Accordingly, in some embodiments, the receiving MCN can communicate with a UE (or other destination within its MCN) without using a destination identifier, such as an IP address. In some cases, even when the receiving MCN is the local MCN and the registered MCN, the receiving MCN can use a session identifier for communications with the UE.

In certain embodiments, all communications between the receiving MCN and the UE can be done without using a destination identifier, including all user plane traffic and all control plane traffic. In some embodiments, however, at least some of the communications between the receiving MCN and the UE can be done using a destination identifier. [0140] Fewer, more, or different blocks can be used in routine 500 as desired. For example, any one or more blocks from routines 400 and/or 600, can be used in conjunction with routine 500. In addition, in some embodiments, such as when the receiving MCN is a relay or host MCN communication system, prior to unencapsulating the inter-MCN or user packet from the carrier, the receiving MCN can determine whether it is to forward the carrier packet without unencapsulating the inter-MCN or user packet. For example, as part of the routine 500, the receiving MCN can determine that the destination of the carrier packet is a different MCN communication system and can forward the carrier packet towards its destination. Any one or any combination of the above-referenced embodiments can be used as desired.

Processing Incoming Packets

Figure 6:
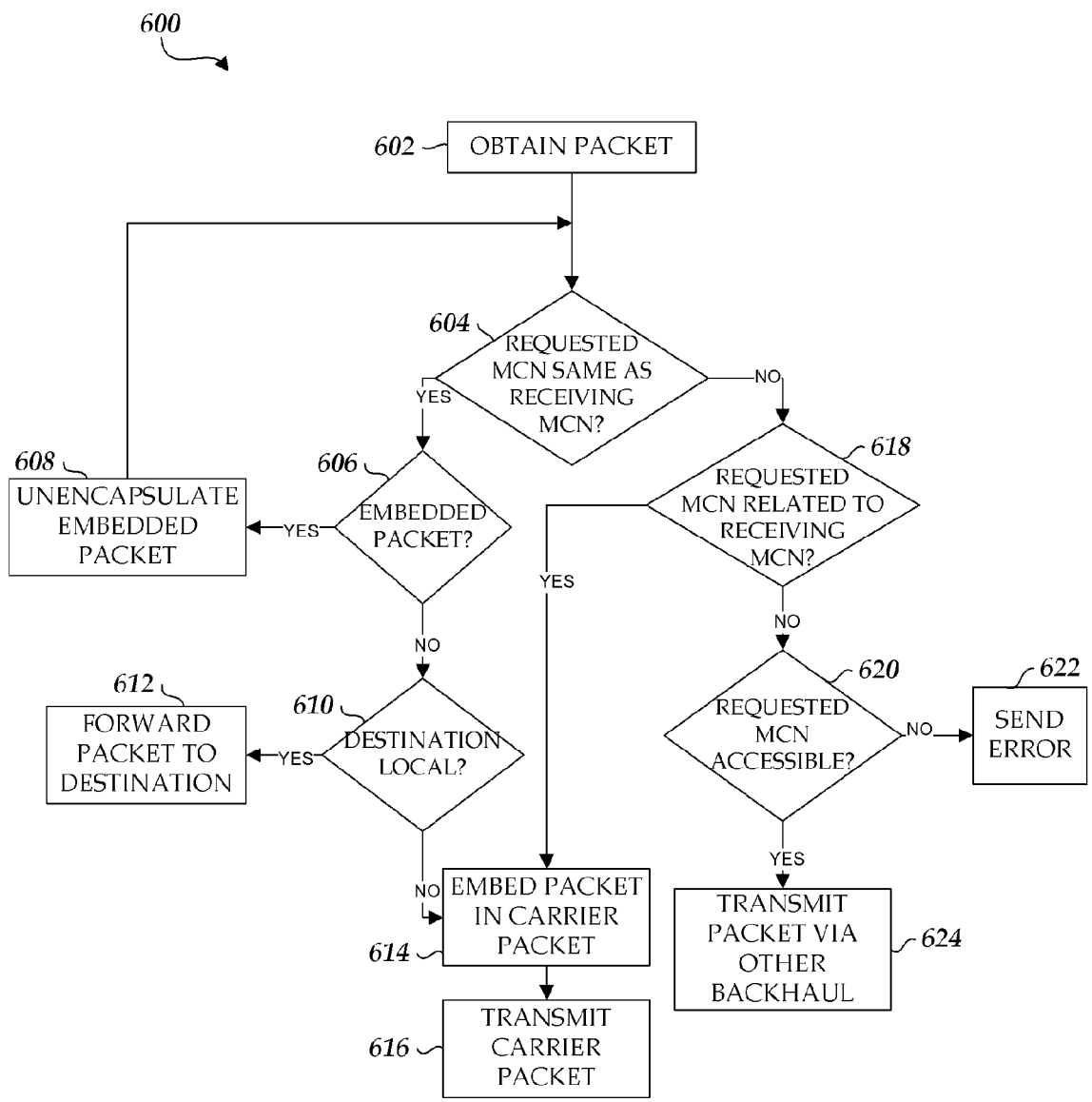
FIG. 6 is a flow diagram illustrative of an embodiment of a routine implemented by a MCN communication system for processing an incoming packet.

FIG. 6 is a flow diagram illustrative of an embodiment of a routine 600 implemented by a MCN communication system (generally referred to herein as the "receiving MCN") for processing an incoming packet. The receiving MCN can be a host MCN communication system, a client MCN communication system, a relay MCN communication system, the local MCN, registered MCN, and/or requested MCN. One skilled in the relevant art will appreciate that the elements outlined for routine 600 may be implemented by one or many computing devices/components that are associated with the receiving MCN, such as the control and data component 152, the backhaul routing component 156, etc. Accordingly, routine 600 has been logically associated as being generally performed by the receiving MCN, and thus the following illustrative embodiments should not be construed as limiting. In addition, although reference below is made to packets being transmitted to/from UEs, it will be understood that reference to the UEs is for simplicity and that the routine 600 can be equally used to encapsulate packets to/from other destinations, such as applications, servers, components of the MCN communication systems, etc.

At block 602, the receiving MCN obtains a packet, as described in greater detail above with reference to block 402 of FIG. 4, FIG. 2, FIGS. 3A-3F, and elsewhere. In some embodiments, such as when the packet is a user packet and/or a carrier packet the receiving MCN can analyze the source, destination, and/or session identifier of the obtained packet.

At decision block 604, the receiving MCN determines whether the requested MCN is the same as the receiving MCN. As described in greater detail above with reference to block 404 of FIG. 4, FIG. 2, FIGS. 3A-3F, and elsewhere, the receiving MCN can determine whether it is the requested MCN based at least in part on a review of the session identifier, source identifier, and/or destination identifier.

If it is determined that that the receiving MCN is the requested MCN, the receiving MCN can move to decision block 608 and determine whether the obtained packet includes an embedded packet. As described in greater detail above with reference to block 504 of FIG. 5, FIG. 2, FIGS. 3A-3F, and elsewhere, the receiving MCN can determine whether the obtained packet includes an embedded packet based at least in part on the source and/or destination identifiers of the packet, the session identifier of the packet and/or a flag in the packet.

If it is determined that the packet includes an embedded packet (e.g., the obtained packet is an inter-MCN or a carrier packet), the receiving MCN can move to block 608 and unencapsulate a user packet from the inter-MCN or carrier packet and/or unencapsulate an inter-MCN packet from the carrier packet, as described in greater detail above with reference to block 506 of FIG. 5, FIG. 2, FIGS. 3A-3F, and elsewhere. The receiving MCN can then determine whether the requested MCN of the unencapsulated inter-MCN or unencapsulated user packet is the same as the receiving MCN, as illustrated at block 604 and described previously.

On the other hand, if it is determined that the packet does not include an embedded packet, the receiving MCN can move to decision block 610 and determine whether the destination is local (e.g., whether the receiving MCN is the local MCN for the destination). As described in greater detail above, to determine whether the destination is local, the receiving MCN can review the session identifier of the user packet, the destination identifier of the user packet, and/or the session identifier of the destination/destination identifier. As described above, in some instances a UE or other device can be registered with a MCN communication system but remotely located from it. In such embodiments, the receiving MCN can store data (e.g., one or more session identifiers) regarding the location of the UE or other device and/or how to access the device (e.g., an identifier for the MCN communication system that can communicate with the device, etc.).

If it is determined that the destination is local (or is to be accessed over a backhaul using the receiving MCN), the receiving MCN can forward the user packet to the destination, as illustrated at block 612. In some embodiments, such as when the destination is registered with the receiving MCN, the receiving MCN can forward/transmit the user packet to the destination using one or more destination identifiers (e.g., IP addresses, etc.) and/or session identifiers. As non-limiting examples, if the destination is a UE, the receiving MCN can transmit/forward the packet using the IP address and/or session identifier of the UE. If the destination is a server, the receiving MCN can communicate/forward the packet using the destination identifier. If the destination is a component of the receiving MCN, the receiving MCN can forward the packet to the destination using the destination identifier.

In some instances, such as when the destination is not registered with the receiving MCN, the receiving MCN can forward/transmit the packet using one or more session identifiers. For example, as described in greater detail above, one or more identifiers can be used to track communications between a non-registered UE and the receiving MCN. These identifiers can be used to forward/transmit the packet to the non-registered UE. In some embodiments, the receiving MCN forwards/transmits the packet without using a destination identifier, such as an IP address, etc.

On the other hand, if the receiving MCN determines that the destination is not local, the receiving MCN can move to block 614 and embed the packet in an inter-MCN and/or carrier packet. As part of this process, in some embodiments, the receiving MCN can determine the location of the UE and/or other device. For example, the receiving MCN can review information that it has stored (or received) regarding a UE that is registered with the receiving MCN and remotely located (e.g., one or more session identifiers for the UE). Based on the determined location of the UE, the receiving MCN can route the inter-MCN and/or carrier packet towards the determined location of the UE. In certain embodiments, the receiving MCN can embed the packet in a carrier packet without determining the location of the UE or other device. For example, in certain embodiments, a client MCN communication system, can rely on a host or relay MCN communication system to determine the location of the UE. In some instances, the receiving MCN can embed a user packet in a carrier packet without embedding the user packet in an inter-MCN packet. For example, if the destination is a server that is co-located with another MCN communication system, the receiving MCN can encapsulate a packet for the server in a carrier packet without encapsulating the packet within a inter-MCN packet.

At block 616, the receiving MCN transmits the inter-MCN and/or carrier packet. As described in greater detail above with reference to block 408 of FIG. 4, FIG. 2, FIGS. 3A-3F, and elsewhere, the carrier packet can include source/destination identifiers, a network identifier, etc., and the receiving MCN can transmit the carrier packet as user plane traffic to a related MCN communication system. In some embodiments, the carrier packet is transmitted using the same or similar wireless standard that is used for transmitting packets between a UE and the receiving MCN.

Returning to decision block 604, if the receiving MCN determines that the requested MCN is not the same as the receiving MCN, the receiving MCN can determine whether the destination is accessible via a related MCN communication system, as illustrated at decision block 618. The receiving MCN can determine whether the destination is accessible via a related MCN and/or whether the requested MCN is related to the receiving MCN, in a variety of ways. In some embodiments, as described in greater detail above, with reference to FIGS. 1 and 2, and elsewhere, the receiving MCN can determine whether the requested MCN is related to the receiving MCN and/or whether the destination is accessible via a related MCN communication system by comparing the session identifier of the packet with the session identifiers of the MCN communication systems that are related to the receiving MCN (e.g., host, client, and/or relay MCN communication systems related to the receiving MCN). If there is a match, the receiving MCN can determine that the requested MCN is related to the receiving MCN and/or that the destination is accessible via a related MCN communication system. In certain embodiments, the receiving MCN can compare the destination identifier with a table of identifiers of related MCN communication systems. If there is a match, the receiving MCN can determine that the requested MCN is related and/or that the destination is accessible via a related MCN communication system. In some instances, the receiving MCN can determine whether the requested MCN is related to the receiving MCN based at least on a review of MCN communications systems that are registered with the receiving MCN as UEs and/or a review of MCN communications systems with which the receiving MCN is registered as a UE.

Based at least in part on a determination that the destination is accessible via a related MCN and/or the receiving MCN is related to the receiving MCN, the receiving MCN can move to blocks 614, 616 and embed the user and/or inter-MCN packet in an inter-MCN and/or carrier packet and transmit the inter-MCN and/or carrier packet, respectively, as described previously. In some embodiments, as described in greater detail above with reference to FIGS. 2 and 3A-3F, and elsewhere, the receiving MCN can identify a destination for the carrier packet based at least in part on the identified requested MCN of the inter-MCN and/or user packet. In certain embodiments, the receiving MCN can embed the inter-MCN and/or user packet in the carrier packet and transmit the carrier packet without identifying the requested MCN.

On the other hand, if the receiving MCN determines that the destination is not accessible via a related MCN and/or the requested MCN is not related to the receiving MCN, the receiving MCN can move to block 620 and determine whether the destination is accessible and/or whether the requested MCN is accessible. For example, as described in greater detail above with reference to FIGS. 2 and 3A-3F, and elsewhere, the receiving MCN can be associated with MCN communication systems with which it is not related. For example, a host MCN communication system can be associated with, or include information to access, one or more other host MCN communication systems, clients of the other host MCN communication systems, and/or standalone MCN communication systems. In addition, the receiving MCN can communicate with one or more external networks via a typical backhaul. To determine whether the receiving MCN is associated with, or has access to, the requested MCN or the destination, the receiving MCN can compare identifiers of the associated MCN communication systems with the identifiers in the packet (e.g., the source/destination identifiers, the network identifier, and/or session identifiers, etc.). If there is not a match, the receiving MCN can determine that it cannot access the requested MCN and/or the destination and send an error message, as illustrated at block 622. On the other hand, if there is a match, the receiving MCN can determine that the destination and/or requested MCN is accessible and transmit the packet to or towards the destination and/or requested MCN using another backhaul technology or standard, such as wired, satellite, and/or microwave communications, and as described in greater detail above with reference to FIGS. 2 and 3A-3F, and elsewhere.

Fewer, more, or different blocks can be used as part of the routine 600 as desired. For example, any one or more blocks from routines 400 and/or 500, described above, can be used in conjunction with routine 600. In addition, in some embodiments, such as when the receiving MCN is a client or relay MCN communication system, the routine 600 can omit blocks 618-624. In addition, in such embodiments, in some cases, if the receiving MCN determines at decision block 604 that the requested MCN is not the same as the receiving MCN, the receiving MCN can embed the packet in a carrier packet as illustrated at block 614, and automatically transmit the carrier packet, as illustrated at block 616. As described previously, in some cases, such as when the receiving MCN is a relay MCN communication system, the receiving MCN can embed packet and automatically transmit the carrier packet to a host with which the relay MCN communication system is registered, another relay that is registered with the relay MCN communication system or with which the relay MCN communication system is registered, or a client MCN communications system that is registered with the relay MCN communication system. In certain instances, such as when the receiving MCN is a client MCN communications system, the receiving MCN can embed the packet and automatically transmit the carrier packet to a host or relay MCN communication system with which the client MCN communication system is registered. In certain embodiments, if the obtained packet is a carrier packet, the routine can include blocks 604 and 608, etc.

In addition, in some embodiments, such as when the receiving MCN is a relay MCN communication system, as part of block 614, the receiving MCN can, or attempt to, identify the requested MCN of an inter-MCN packet. For example, the receiving MCN can determine whether the requested MCN of the inter-MCN packet is a host, client or another relay MCN communication system that is registered with the receiving MCN, or with which receiving MCN is registered. If the requested MCN of the inter-MCN packet is a host, client or another relay MCN communication system that is registered with the receiving MCN or with which receiving MCN is registered, the receiving MCN can direct the carrier packet to or towards the requested MCN of the inter-MCN packet. If the requested MCN is not registered with the receiving MCN and the receiving MCN is not registered with the requested MCN, the receiving MCN can direct the carrier packet to a host MCN communication system.

In some embodiments, if the receiving MCN determines at decision block 610 that the destination is not local it can move to block 618 to determine whether the destination is accessible via a related MCN communication system. If the receiving MCN determines that the local MCN is destination is accessible via a related MCN communication system, the receiving MCN can embed the packet in a carrier packet as illustrated at block 614 and transmit the carrier packet to or towards the local MCN, as illustrated at block 616, as described previously.

Furthermore, in such embodiments, if the receiving MCN determines that the local MCN is not destination is accessible via a related MCN communication system, the receiving MCN can move to block 620 and determine whether the destination is accessible, described previously. Based on the outcome of the determination, the receiving MCN can send an error, as illustrated at block 622 or transmit the packet via another backhaul, as illustrated at block 624. Any one or any combination of the above-referenced embodiments can be used as desired.

Non-limiting Example Embodiments

Various example embodiments of the disclosure can be described in view of the following clauses:

Clause 1. A mobile cellular network system comprising:
  a first mobile cellular network (MCN) communication system located within a first covered area and configured to generate a first MCN for the first covered area and provide first communication links to one or more first user equipment within the first covered area, the first MCN communication system comprising:
    a first radio access component configured to receive first wireless communications according to a first wireless standard from the one or more first user equipment,
    a first control and data component in communication with the first radio access component and configured to process the first wireless communications according to the first wireless standard, and
    a first data store comprising authentication data of the one or more first user equipment within the first covered area,
  wherein the first MCN communication system independently provides the first MCN for the one or more first user equipment in the first covered area; and
  a second MCN communication system located within a second covered area and configured to generate a second MCN for the second covered area and provide second communication links to one or more second user equipment within the second covered area, the second MCN communication system comprising:
    a second radio access component configured to receive second wireless communications according to the first wireless standard from the one or more second user equipment,
    a second control and data component in communication with the second radio access component and configured to process the second wireless communications according to the first wireless standard, and a second data store comprising authentication data of the one or more second user equipment within the second covered area, wherein the second MCN communication system independently provides the second MCN for the one or more second user equipment in the second covered area, and wherein the first MCN communication system and the second MCN communication system communicate with each other using the first wireless standard.

Clause 2. The mobile cellular network system of Clause 1, wherein the first MCN communication system is registered and communicates with the second MCN communication system as a user equipment of the second MCN communication system.

Clause 3. The mobile cellular network system of Clause 1, wherein the second MCN communication system is registered and communicates with the first MCN communication system as a user equipment of the first MCN communication system.

Clause 4. A mobile cellular network system comprising:
 a first mobile cellular network (MCN) communication system located within a first covered area and configured to generate a first MCN for the first covered area and provide first communication links to one or more first user equipment within the first covered area, the first MCN communication system comprising:
  a first radio access component configured to receive first wireless communications according to a first wireless standard from the one or more first user equipment,
  a first control and data component in communication with the first radio access component and configured to process the first wireless communications according to the first wireless standard, and
  a first data store comprising authentication data of the one or more first user equipment within the first covered area,
 wherein the first MCN communication system independently provides the first MCN for the one or more first user equipment in the first covered area; and
 wherein the first MCN communication system communicates with other MCN communication systems using the first wireless standard.

Clause 5. The mobile cellular network system of Clause 4, wherein the first MCN communication system further comprises a first routing module, and wherein the first MCN communication system is further configured to:
 determine using an identifier of a first packet at the first MCN communication system that the first MCN communication system is different from a requested MCN communication system;
 based at least in part on the determination that the first MCN communication system is different from the requested MCN communication system, encapsulate the first packet within a second packet, wherein a destination address of the second packet comprises a second routing module of a second MCN communication system and a source address of the second packet comprises the first routing module, and
 cause the first MCN communication system to transmit the second packet to the second MCN communication system using the first wireless standard.

Clause 6. The mobile cellular network system of Clause 5, wherein the first packet is received from at least one of the one or more first user equipment and the identifier of the first packet comprises a session identifier.

Clause 7. The mobile cellular network system of Clause 5, wherein the first packet is obtained from the first control and data component and the identifier of the first packet comprises a destination identifier.

Clause 8. The mobile cellular network system of any of Clauses 5-7, wherein to encapsulate the first packet within the second packet, the MCN communication system is further configured to:
 encapsulate the first packet within a third packet, wherein a destination address of the third packet comprises a control and data component of the requested MCN communication system and a source address of the third packet comprises the first control and data component; and
 encapsulate the third packet within the second packet.

Clause 9. The mobile cellular network system of any of Clauses 5-8, wherein the second MCN communication system is the requested MCN communication system.

Clause 10. The mobile cellular network system of any of Clauses 5-9, wherein a destination for the first packet is at least one of a user equipment within a second MCN provided by the second MCN communication system, a server accessible via the second MCN communication system, and a component of the second MCN communication system.

Clause 11. The mobile cellular network system of any of Clauses 5-8, wherein the requested MCN communication system is a third MCN communication system.

Clause 12. The mobile cellular network system of any of Clauses 5-11, wherein the second MCN communication system is configured to:
 receive the second packet using the first wireless standard;
 determine that the second packet includes an embedded packet; and
 based at least in part on a determination that the second packet includes the embedded packet, unencapsulate the first packet from the second packet.

Clause 13. The mobile cellular network system of Clause 12, wherein the second MCN communication system is further configured to:
 determine that the second MCN communication system is the requested MCN communication system; and
 based at least in part on a determination that the second MCN communication system is the requested MCN communication system, route the first packet towards or to the destination.

Clause 14. The mobile cellular network system of Clause 12, wherein the second MCN communication system is further configured to:
 determine that the second MCN communication system is different from the requested MCN communication system; and
 based at least in part on the determination that the second MCN communication system is different from the requested MCN communication system, encapsulate the first packet within a third packet, wherein a destination address of the third packet comprises a third routing module of a third MCN communication system and a source address of the third packet comprises the second routing module.

Clause 15. The mobile cellular network system of Clause 14, wherein at least one of the first MCN communication system and the third MCN communication system are registered with the second MCN communication system as a user equipment of the second MCN communication system.

Clause 16. The mobile cellular network system of Clause 4, wherein the first MCN communication system is further configured to:
  receive a first packet from a second MCN communication system using the first wireless standard;
  determine that the first packet includes an embedded packet; and
  based at least in part on a determination that the first packet includes the embedded packet, unencapsulate a second packet from the first packet.

Clause 17. The mobile cellular network system of Clause 16, wherein the second MCN communication system is registered with the first MCN communication system as a user equipment of the first MCN communication system.

Clause 18. The mobile cellular network system of any of Clauses 16 and 17, wherein the first MCN communication system is further configured to:
  determine based at least in part on an identifier in the second packet that the first MCN communication system is a requested MCN communication system; and
  based at least in part on the determination that the first MCN communication system is the requested MCN communication system, route the first packet towards or to the destination.

Clause 19. The mobile cellular network system of any of Clauses 16-18, wherein the source of the second packet is a user equipment or server in communication with the second MCN communication system.

Clause 20. The mobile cellular network system of any of Clauses 16-18, wherein the source of the second packet is a mobile core network component of the second MCN communication system.

Clause 21. The mobile cellular network system of any of Clauses 16-20, wherein the destination for the second packet is a user equipment within the first MCN or a server in communication with the first MCN communication system.

Clause 22. The mobile cellular network system of any of Clauses 16-20, wherein the destination for the second packet is a mobile core network component of the first MCN communication system.

Clause 23. The mobile cellular network system of any of Clauses 16-20, wherein the second MCN communication system is further configured to:
  determine based at least in part on an identifier in the second packet that the second MCN communication system is different from a requested MCN communication system;
  based at least in part on the determination that the second MCN communication system is different from the requested MCN communication system, encapsulate the second packet within a third packet, wherein a destination address of the third packet comprises a third routing module of a third MCN communication system and a source address of the third packet comprises the first routing module; and
  cause the first MCN communication system to transmit the third packet to the third MCN communication system using the first wireless standard.

Clause 24. The mobile cellular network system of Clause 23, wherein the third MCN communication system is registered with the first MCN communication system as a user equipment of the first MCN communication system.

Clause 25. The mobile cellular network system of Clause 4, wherein the first MCN communication system further comprises a first routing module, and wherein the first MCN communication system is further configured to:
  determine using an identifier of a first packet at the first MCN communication system that the first MCN communication system is different from a requested MCN communication system;
  based at least in part on the determination that the first MCN communication system is different from the requested MCN communication system, encapsulate the first packet within a second packet, wherein a destination address of the second packet comprises a second routing module of a second MCN communication system and a source address of the second packet comprises the first routing module, and
  cause the first MCN communication system to transmit the second packet to a third MCN communication system using the first wireless standard,
  wherein the third MCN communication system is configured to:
    receive the second packet using the first wireless standard;
    determine that a destination of the second packet is the second MCN communication system; and
    based at least in part on the determination that the destination of the second packet is the second MCN communication system, transmit the second packet to or towards the second MCN communication system.

Clause 26. A method comprising:
  independently providing a first mobile cellular network (MCN) according to a first wireless standard to a first covered area using a first mobile MCN communication system, wherein the first MCN communication is located within the first covered area and comprises:
    a first radio access component configured to receive wireless communications from one or more first user equipment located within the covered area,
    a first control and data component in communication with the first radio access component and configured to process the first wireless communications according to the first wireless standard, and
    a first data store comprising authentication data of the one or more first user equipment within the first covered area; and
  establishing communications with one or more other MCN communication systems using the first wireless standard.

Clause 27. The method of Clause 26, further comprising:
  determining from an identifier of a first packet at the first MCN communication system that the first MCN communication system is different from a requested MCN communication system;
  based at least in part on a determination that the first MCN communication system is different from the requested MCN communication system, encapsulating the first packet within a second packet, wherein a destination address of the second packet comprises a second routing module of a second MCN communication system and a source address of the second packet comprises the first routing module, and
  causing the first MCN communication system to transmit the second packet to the second MCN communication system using the first wireless standard.

Clause 28. The method of Clause 27, further comprising receiving the first packet from at least one of the one or more first user equipment, wherein the identifier of the first packet comprises a session identifier.

Clause 29. The method of Clause 27, further comprising obtaining the first packet from the first control and data component, wherein the identifier of the first packet comprises a destination identifier.

Clause 30. The method of any of Clauses 27-29, encapsulating the first packet within the second packet, comprises:
  encapsulating the first packet within a third packet, wherein a destination address of the third packet comprises a control and data component of the requested MCN communication system and a source address of the third packet comprises the first control and data component; and
  encapsulate the third packet within the second packet.

Clause 31. The method of any of Clauses 27-30, wherein the second MCN communication system is the requested MCN communication system.

Clause 32. The method of any of Clauses 27-31, wherein a destination for the first packet is at least one of a user equipment within a second MCN provided by the second MCN communication system, a server accessible via the second MCN communication system, and a component of the second MCN communication system.

Clause 33. The method of any of Clauses 27-30, wherein the requested MCN communication system is a third MCN communication system.

Clause 34. The method of any of Clauses 27-33, further comprising:
  receiving at the second MCN communication system, the second packet using the first wireless standard;
  determining at the second MCN communication system that the second packet includes an embedded packet; and
  based at least in part on the determining that the second packet includes the embedded packet, unencapsulating the first packet from the second packet.

Clause 35. The method of Clause 34, further comprising:
  determine that the second MCN communication system is the requested MCN communication system; and
  based at least in part on a determination that the second MCN communication system is the requested MCN communication system, route the first packet towards or to the destination.

Clause 36. The method of Clause 34, further comprising:
  determining that the second MCN communication system is different from the requested MCN communication system; and
  based at least in part on the determination that the second MCN communication system is different from the requested MCN communication system, encapsulating the first packet within a third packet, wherein a destination address of the third packet comprises a third routing module of a third MCN communication system and a source address of the third packet comprises the second routing module.

Clause 37. The method of Clause 36, wherein the first MCN communication system and the third MCN communication system are registered with the second MCN communication system as user equipment of the second MCN communication system.

Clause 38. The method of Clause 25, further comprising:
  receiving at the first MCN communication system a first packet from a second MCN communication system using the first wireless standard;
  determining that the first packet includes an embedded packet; and
  based at least in part on the determining that the first packet includes the embedded packet, unencapsulating a second packet from the first packet.

Clause 39. The method of Clause 38, wherein the second MCN communication system is registered with the first MCN communication system as a user equipment of the first MCN communication system.

Clause 40. The method of any of Clauses 38 and 39, further comprising:
  determining based at least in part on an identifier in the second packet that the first MCN communication system is a requested MCN communication system; and
  based at least in part on the determining that the first MCN communication system is the requested MCN communication system, routing the first packet towards or to the destination.

Clause 41. The method of any of Clauses 38-40, wherein the source of the second packet is a user equipment or server in communication with the second MCN communication system.

Clause 42. The method of any of Clauses 38-40, wherein the source of the second packet is a mobile core network component of the second MCN communication system.

Clause 43. The method of any of Clauses 38-42, wherein the destination for the second packet is a user equipment within the first MCN or a server in communication with the first MCN communication system.

Clause 44. The method of any of Clauses 38-42, wherein the destination for the second packet is a mobile core network component of the first MCN communication system.

Clause 45. The method of any of Clauses 38-42, further comprising:
  determining based at least in part on an identifier in the second packet that the first MCN communication system is different from a requested MCN communication system;
  based at least in part on the determining that the first MCN communication system is different from the requested MCN communication system, encapsulating the second packet within a third packet, wherein a destination address of the third packet comprises a third routing module of a third MCN communication system and a source address of the third packet comprises the first routing module; and
  causing the first MCN communication system to transmit the third packet to the third MCN communication system using the first wireless standard.

Clause 46. The method of Clause 45, wherein the third MCN communication system is registered with the first MCN communication system as a user equipment of the first MCN communication system.

Clause 47. A method comprising:
  independently providing a first mobile cellular network (MCN) according to a first wireless standard to a first covered area using a first mobile MCN communication system, wherein the first MCN communication is located within the first covered area and comprises:
    a first radio access component configured to receive wireless communications from one or more first user equipment located within the covered area,
    a first control and data component in communication with the first radio access component and configured to process the first wireless communications according to the first wireless standard,
    a first routing module and a first data store comprising authentication data of the one or more first user equipment within the first covered area; and registering with a second MCN communication system as a user equipment of the second MCN communication system.

Clause 48. A method comprising:
independently providing a first mobile cellular network (MCN) according to a first wireless standard to a first covered area using a first mobile MCN communication system, wherein the first MCN communication is located within the first covered area and comprises:
a first radio access component configured to receive wireless communications from one or more first user equipment located within the covered area,
a first control and data component in communication with the first radio access component and configured to process the first wireless communications according to the first wireless standard,
a first routing module and
a first data store comprising authentication data of the one or more first user equipment within the first covered area; and
registering a second MCN communication system as a user equipment of the first MCN communication system.

Clause 49. A method comprising:
independently providing a first mobile cellular network (MCN) according to a first wireless standard to a first covered area using a first mobile MCN communication system, wherein the first MCN communication is located within the first covered area and comprises:
a first radio access component configured to receive wireless communications from one or more first user equipment located within the covered area,
a first control and data component in communication with the first radio access component and configured to process the first wireless communications according to the first wireless standard,
a first routing module and
a first data store comprising authentication data of the one or more first user equipment within the first covered area; and
establishing communications with one or more other MCN communication systems using the first wireless standard;
receiving a first packet from a second MCN communication system using the first wireless standard;
determining that the first packet includes an embedded packet; and
based at least in part on a determination that the second packet includes the embedded packet, unencapsulating a second packet from the first packet and processing the second packet.

Clause 50. A method comprising:
independently providing a first mobile cellular network (MCN) according to a first wireless standard to a first covered area using a first mobile MCN communication system, wherein the first MCN communication is located within the first covered area and comprises:
a first radio access component configured to receive wireless communications from one or more first user equipment located within the covered area,
a first control and data component in communication with the first radio access component and configured to process the first wireless communications according to the first wireless standard,
a first routing module and
a first data store comprising authentication data of the one or more first user equipment within the first covered area; and
obtaining a first packet;
determining that the first MCN communication system is different from a requested MCN communication system;
based at least in part on the determining that the first MCN communication system is different from the requested MCN communication system, encapsulating the first packet within a second packet, wherein a destination address of the second packet comprises a component of a second MCN communication system and a source address of the second packet comprises a component of the first MCN communication system; and
causing the first MCN communication system to transmit the second packet to the second MCN communication system using the first wireless standard.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention may be recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. §112(f) will begin with the words "means for", but use of the term "for" in any other context is not intended to invoke treatment under 35 U.S.C. §112(f). Accordingly, the applicant reserves the right to pursue additional claims after filing this application, in either this application or in a continuing application.

What is claimed is:

1. A mobile cellular network system comprising:
a first mobile cellular network (MCN) communication system located within a first covered area and configured to generate a first MCN for the first covered area and provide first communication links to one or more first user equipment within the first covered area, the first MCN communication system comprising:
   a first radio access component configured to receive first wireless communications according to a first wireless standard from the one or more first user equipment,
   a first control and data component in communication with the first radio access component and configured to process the first wireless communications according to the first wireless standard, and
   a first data store comprising authentication data of the one or more first user equipment within the first covered area,
wherein the first MCN communication system independently provides the first MCN for the one or more first user equipment in the first covered area; and
a second MCN communication system located within a second covered area and configured to generate a second MCN for the second covered area and provide second communication links to one or more second user equipment within the second covered area, the second MCN communication system comprising:

a second radio access component configured to receive second wireless communications according to the first wireless standard from the one or more second user equipment, a second control and data component in communication with the second radio access component and configured to process the second wireless communications according to the first wireless standard, and a second data store comprising authentication data of the one or more second user equipment within the second covered area, wherein the second MCN communication system independently provides the second MCN for the one or more second user equipment in the second covered area, and wherein the first MCN communication system and the second MCN communication system communicate with each other using the first wireless standard.

2. The mobile cellular network system of claim 1, wherein the first MCN communication system is registered and communicates with the second MCN communication system as a user equipment of the second MCN communication system.

3. The mobile cellular network system of claim 1, wherein the second MCN communication system is registered and communicates with the first MCN communication system as a user equipment of the first MCN communication system.

4. A mobile cellular network system comprising:

a first mobile cellular network (MCN) communication system located within a first covered area and configured to generate a first MCN for the first covered area and provide first communication links to one or more first user equipment within the first covered area, the first MCN communication system comprising:

a first radio access component configured to receive first wireless communications according to a first wireless standard from the one or more first user equipment, a first control and data component in communication with the first radio access component and configured to process the first wireless communications according to the first wireless standard, and a first data store comprising authentication data of the one or more first user equipment within the first covered area, wherein the first MCN communication system independently provides the first MCN for the one or more first user equipment in the first covered area; and wherein the first MCN communication system communicates with other MCN communication systems using the first wireless standard.

5. The mobile cellular network system of claim 4, wherein the first MCN communication system further comprises a first routing module, and wherein the first MCN communication system is further configured to:

determine using an identifier of a first packet at the first MCN communication system that the first MCN communication system is different from a requested MCN communication system;

based at least in part on the determination that the first MCN communication system is different from the requested MCN communication system, encapsulate the first packet within a second packet, wherein a destination address of the second packet comprises a second routing module of a second MCN communication system and a source address of the second packet comprises the first routing module, and cause the first MCN communication system to transmit the second packet to the second MCN communication system using the first wireless standard.

6. The mobile cellular network system of claim 5, wherein the first packet is received from at least one of the one or more first user equipment and the identifier of the first packet comprises a session identifier.

7. The mobile cellular network system of claim 5, wherein the first packet is obtained from the first control and data component and the identifier of the first packet comprises a destination identifier.

8. The mobile cellular network system of claim 5, wherein to encapsulate the first packet within the second packet, the MCN communication system is further configured to:

encapsulate the first packet within a third packet, wherein a destination address of the third packet comprises a control and data component of the requested MCN communication system and a source address of the third packet comprises the first control and data component; and encapsulate the third packet within the second packet.

9. The mobile cellular network system of claim 5, wherein the second MCN communication system is the requested MCN communication system.

10. The mobile cellular network system of claim 5, wherein a destination for the first packet is at least one of a user equipment within a second MCN provided by the second MCN communication system, a server accessible via the second MCN communication system, and a component of the second MCN communication system.

11. The mobile cellular network system of claim 5, wherein the requested MCN communication system is a third MCN communication system.

12. The mobile cellular network system of claim 5, wherein the second MCN communication system is configured to:

receive the second packet using the first wireless standard;

determine that the second packet includes an embedded packet; and based at least in part on a determination that the second packet includes the embedded packet, unencapsulate the first packet from the second packet.

13. The mobile cellular network system of claim 12, wherein the second MCN communication system is further configured to:

determine that the second MCN communication system is the requested MCN communication system; and based at least in part on a determination that the second MCN communication system is the requested MCN communication system, route the first packet towards or to the destination.

14. The mobile cellular network system of claim 12, wherein the second MCN communication system is further configured to:

determine that the second MCN communication system is different from the requested MCN communication system; and based at least in part on the determination that the second MCN communication system is different from the requested MCN communication system, encapsulate the first packet within a third packet, wherein a destination address of the third packet comprises a third routing module of a third MCN communication system and a source address of the third packet comprises the second routing module.

15. The mobile cellular network system of claim 14, wherein at least one of the first MCN communication system and the third MCN communication system are registered with the second MCN communication system as a user equipment of the second MCN communication system.

16. The mobile cellular network system of claim 4, wherein the first MCN communication system is further configured to:

receive a first packet from a second MCN communication system using the first wireless standard;

determine that the first packet includes an embedded packet; and based at least in part on a determination that the first packet includes the embedded packet, unencapsulate a second packet from the first packet.

17. The mobile cellular network system of claim 16, wherein the second MCN communication system is registered with the first MCN communication system as a user equipment of the first MCN communication system.

18. The mobile cellular network system of claim 16, wherein the first MCN communication system is further configured to:

determine based at least in part on an identifier in the second packet that the first MCN communication system is a requested MCN communication system; and based at least in part on the determination that the first MCN communication system is the requested MCN communication system, route the first packet towards or to the destination.

19. The mobile cellular network system of claim 16, wherein the source of the second packet is a user equipment or server in communication with the second MCN communication system.

20. The mobile cellular network system of claim 16, wherein the source of the second packet is a mobile core network component of the second MCN communication system.

21. The mobile cellular network system of claim 16, wherein the destination for the second packet is a user equipment within the first MCN or a server in communication with the first MCN communication system.

22. The mobile cellular network system of claim 16, wherein the destination for the second packet is a mobile core network component of the first MCN communication system.

23. The mobile cellular network system of claim 16, wherein the second MCN communication system is further configured to:

determine based at least in part on an identifier in the second packet that the first MCN communication system is different from a requested MCN communication system;

based at least in part on the determination that the second MCN communication system is different from the requested MCN communication system, encapsulate the second packet within a third packet, wherein a destination address of the third packet comprises a third routing module of a third MCN communication system and a source address of the third packet comprises the first routing module; and cause the second MCN communication system to transmit the third packet to the third MCN communication system using the first wireless standard.

24. The mobile cellular network system of claim 23, wherein the third MCN communication system is registered with the first MCN communication system as a user equipment of the first MCN communication system.

25. The mobile cellular network system of claim 4, wherein the first MCN communication system further comprises a first routing module, and wherein the first MCN communication system is further configured to:

determine using an identifier of a first packet at the first MCN communication system that the first MCN communication system is different from a requested MCN communication system;

based at least in part on the determination that the first MCN communication system is different from the requested MCN communication system, encapsulate the first packet within a second packet, wherein a destination address of the second packet comprises a second routing module of a second MCN communication system and a source address of the second packet comprises the first routing module, and cause the first MCN communication system to transmit the second packet to a third MCN communication system using the first wireless standard, wherein the third MCN communication system is configured to:

receive the second packet using the first wireless standard;

determine that a destination of the second packet is the second MCN communication system; and based at least in part on the determination that the destination of the second packet is the second MCN communication system, transmit the second packet to or towards the second MCN communication system.

26. A method comprising:

independently providing a first mobile cellular network (MCN) according to a first wireless standard to a first covered area using a first mobile MCN communication system, wherein the first MCN communication is located within the first covered area and comprises:

a first radio access component configured to receive wireless communications from one or more first user equipment located within the covered area, a first control and data component in communication with the first radio access component and configured to process the first wireless communications according to the first wireless standard, and a first data store comprising authentication data of the one or more first user equipment within the first covered area; and establishing communications with one or more other MCN communication systems using the first wireless standard.

* * * * *

UNITED STATES PATENT AND TRADEMARK OFFICE
CERTIFICATE OF CORRECTION

PATENT NO. : 9,226,192 B2
APPLICATION NO. : 14/264297
DATED : December 29, 2015
INVENTOR(S) : Vincent Graffagnino It is certified that error appears in the above-identified patent and that said Letters Patent is hereby corrected as shown below:

Specification

In column 10 at line 67, Change "Clients 1-3" to --Clients1-3--.

In column 11 at line 39 (approx.), Change "Clients 1-4" to --Clients1-4--.

In column 11 at line 48, Change "Clients 1-3" to --Clients1-3--.

In column 11 at line 50, Change "Host2" to --Host2.--.

In column 11 at line 60, Change "Host1 Host2 Clients 1-4," to --Host1, Host2, Clients1-4,--.

In column 11 at line 66, Change "Clients 1-4" to --Clients1-4--.

In column 12 at lines 4-5, Change "Clients 1-3" to --Clients1-3--.

In column 12 at line 9, Change "Clients 1-3" to --Clients1-3--.

In column 12 at line 10, Change "Client4and" to --Client4 and--.

In column 12 at line 26, Change "Clients 1-3" to --Clients1-3--.

In column 12 at line 32, Change "Clients 1-3." to --Clients1-3.--.

In column 12 at line 35, Change "Host1" to --Host1.--.

In column 12 at line 36, Change "Clients 1-3." to --Clients1-3--.

In column 12 at line 49, Change "Client1and" to --Client1 and--.

In column 12 at line 50, Change "Client1and Client2can" to --Client1 and Client2 can--.

In column 12 at line 52, Change "Client1and Client2can" to --Client1 and Client2 can--.

In column 14 at line 20, Change "Host1" to --Host1.--.

In column 14 at line 24, Change "Clients1-3" to --Clients1-3.--.

In column 14 at line 25, Change "Clients1-3" to --Clients1-3.--.

In column 14 at line 28, Change "Host1" to --Host1,--.

In column 14 at line 30, Change "Clients1-3" to --Clients1-3,--.

In column 14 at line 37, Change "Clients1-3" to --Clients1-3.--.

Signed and Sealed this
Fifth Day of July, 2016

Michelle K. Lee
*Director of the United States Patent and Trademark Office*

CERTIFICATE OF CORRECTION (continued)
U.S. Pat. No. 9,226,192 B2

Specification

In column 14 at line 40, Change "Host1" to --Host1,--.

In column 14 at line 55, Change "Host1" to --Host1,--.

In column 14 at line 56, Change "Host1" to --Host1,--.

In column 15 at line 38, Change "Host1" to --Host1,--.

In column 15 at line 40, Change "Host1" to --Host1.--.

In column 15 at line 43, Change "Host1" to --Host1,--.

In column 15 at line 46, Change "Host1" to --Host1.--.

In column 15 at line 57, Change "Host1" to --Host1,--.

In column 15 at line 62, Change "Host1" to --Host1,--.

In column 16 at line 20, Change "Host1" to --Host1.--.

In column 16 at line 31, Change "Host1" to --Host1,--.

In column 17 at line 21, Change "Host1" to --Host1.--.

In column 17 at line 31, Change "Host1" to --Host1.--.

In column 17 at line 58, Change "Host1" to --Host1.--.

In column 18 at line 45, Change "Host1" to --Host1.--.

In column 19 at line 1, Change "Host1 PGW of Host1" to --Host1, PGW of Host1,--.

In column 20 at line 43, Change "Host1" to --Host1.--.

In column 20 at line 53, Change "Host1" to --Host1,--.

In column 21 at line 32, Change "Host1" to --Host1.--.

In column 21 at line 57, Change "Host1" to --Host1,--.

In column 22 at line 2, Change "Client1locally" to --Client1 locally--.

In column 22 at line 26, Change "s" to --is--.

In column 22 at line 43, Change "Host1" to --Host1.--.

In column 23 at line 6, Change "Host1" to --Host1,--.

In column 23 at line 12, Change "Host1" to --Host1.--.

In column 23 at line 14, Change "Host1" to --Host1.--.

In column 23 at line 26, Change "Host1" to --Host1,--.

In column 24 at line 8, Change "Host1" to --Host2,--.

In column 24 at line 29, Change "Host2" to --Host2,--.